(12) United States Patent
Akselrod et al.

(10) Patent No.: US 11,493,823 B1
(45) Date of Patent: Nov. 8, 2022

(54) INTEGRATED DRIVER AND HEAT CONTROL CIRCUITRY IN TUNABLE OPTICAL DEVICES

(71) Applicant: Lumotive, LLC, Redmond, WA (US)

(72) Inventors: Gleb M. Akselrod, Kenmore, WA (US); Mark C. Weidman, Redmond, WA (US); Erik Edward Josberger, Renton, WA (US); Tyler Williamson, Redmond, WA (US); Yizhak Sabba, Irvine, CA (US)

(73) Assignee: Lumotive, LLC, Redmond, WA (US)

( * ) Notice: Subject to any disclaimer, the term of this patent is extended or adjusted under 35 U.S.C. 154(b) by 0 days.

(21) Appl. No.: 17/742,389

(22) Filed: May 11, 2022

(51) Int. Cl.
*G02F 1/29* (2006.01)
*G01S 17/36* (2006.01)
(Continued)

(52) U.S. Cl.
CPC .............. *G02F 1/292* (2013.01); *G01S 17/36* (2013.01); *G02F 1/133382* (2013.01);
(Continued)

(58) Field of Classification Search
CPC ............... G02F 1/292; G02F 1/133382; G02F 1/13312; G02F 1/133334; G02F 2201/501;
(Continued)

(56) References Cited

U.S. PATENT DOCUMENTS 6,844,946 B2   1/2005 Buse
9,040,428 B2   5/2015 Hong et al.
(Continued)

FOREIGN PATENT DOCUMENTS

CN    113614570 A    11/2021
EP    3942334 A1    1/2022
(Continued)

OTHER PUBLICATIONS

Arbabi, et al., Dielectric Metasurfaces for Complete Control of Phase and Polarization with Subwavelength Spatial Resolution and High Transmission, arXiv:1411.1494v2 [physics.optics], Sep. 4, 2015, pp. 1-27.
(Continued)

*Primary Examiner* — Tuyen Tra
(74) *Attorney, Agent, or Firm* — Phillips Winchester; Justin K. Flanagan

(57) ABSTRACT

According to various embodiments, a tunable optical device comprises a tunable optical metasurface on a substrate with an integrated driver circuit. In some embodiments, the tunable optical device includes a photon shield layer to prevent optical radiation from disrupting operation of the driver circuit. In some embodiments, the tunable optical device includes a diagnostic circuit to detect and disable defective optical structures of the metasurface. In some embodiments, the tunable optical device includes an integrated heater circuit that maintains a liquid crystal of the metasurface above a minimum operating temperature. In some embodiments, the tunable optical device includes an integrated lidar sequencing controller, a steering pattern subcircuit, and a photodetector circuit.

28 Claims, 31 Drawing Sheets

(51) Int. Cl.
*G02F 1/1333* (2006.01)
*H01Q 15/00* (2006.01)
*H01Q 15/14* (2006.01)
*G02F 1/133* (2006.01)

(52) U.S. Cl.
CPC ....... *H01Q 15/0066* (2013.01); *H01Q 15/148* (2013.01); *G02F 1/13312* (2021.01); *G02F 1/133334* (2021.01); *G02F 2201/501* (2013.01); *G02F 2201/58* (2013.01); *G02F 2202/30* (2013.01); *G02F 2203/15* (2013.01)

(58) Field of Classification Search
CPC ............. G02F 2201/58; G02F 2202/30; G02F 2203/15; G01S 17/36; H01Q 15/0066; H01Q 15/148
USPC ........................................ 359/237, 238, 290
See application file for complete search history.

(56) References Cited

U.S. PATENT DOCUMENTS

| | | | |
|---|---|---|---|
| 9,104,086 B1 | 8/2015 | Davids | |
| 9,195,052 B2 | 11/2015 | Long | |
| 9,476,981 B2 | 10/2016 | Yaacobi | |
| 9,804,329 B2 | 10/2017 | Montazeri et al. | |
| 9,935,375 B2 | 4/2018 | Bowers | |
| 9,946,076 B2 | 4/2018 | Smits | |
| 10,199,415 B2 | 2/2019 | Akselrod | |
| 10,254,448 B2 | 4/2019 | Lee | |
| 10,303,038 B2 | 5/2019 | Kim et al. | |
| 10,332,923 B2 | 6/2019 | Josberger | |
| 10,451,800 B2 | 10/2019 | Akselrod | |
| 10,468,447 B2 | 11/2019 | Akselrod et al. | |
| 10,627,571 B1 | 4/2020 | Akselrod | |
| 10,665,953 B1 | 5/2020 | Akselrod et al. | |
| 10,670,782 B2 | 6/2020 | Arbabi et al. | |
| 10,720,712 B2 | 7/2020 | Foo | |
| 10,816,939 B1 | 10/2020 | Coleman | |
| 10,886,317 B2* | 1/2021 | Akselrod | B82Y 20/00 |
| 10,968,522 B2 | 4/2021 | Akselrod et al. | |
| 11,005,186 B2 | 5/2021 | Akselrod et al. | |
| 11,092,675 B2 | 8/2021 | Akselrod et al. | |
| 2002/0081445 A1 | 6/2002 | Kadomura et al. | |
| 2003/0174940 A1 | 9/2003 | Charlton et al. | |
| 2004/0037497 A1 | 2/2004 | Lee | |
| 2004/0125266 A1 | 7/2004 | Miyauchi et al. | |
| 2005/0117866 A1 | 6/2005 | Park et al. | |
| 2006/0202125 A1 | 9/2006 | Suhami | |
| 2006/0239688 A1 | 10/2006 | Hillis et al. | |
| 2006/0284187 A1 | 12/2006 | Wierer, Jr. et al. | |
| 2007/0013983 A1 | 1/2007 | Kitamura et al. | |
| 2009/0067774 A1 | 3/2009 | Magnusson | |
| 2010/0156573 A1 | 6/2010 | Smith | |
| 2011/0134496 A1 | 6/2011 | Tompkin et al. | |
| 2011/0244613 A1 | 10/2011 | Heck et al. | |
| 2012/0194399 A1 | 8/2012 | Bily et al. | |
| 2012/0267694 A1 | 10/2012 | Kaiser et al. | |
| 2013/0129293 A1 | 5/2013 | Ogawa et al. | |
| 2013/0286633 A1 | 10/2013 | Rodriguez | |
| 2014/0038320 A1 | 2/2014 | Wang | |
| 2014/0085693 A1 | 3/2014 | Mosallaei et al. | |
| 2014/0266946 A1 | 9/2014 | Bily et al. | |
| 2014/0294338 A1 | 10/2014 | Long | |
| 2015/0036198 A1 | 2/2015 | Inokuchi | |
| 2015/0162658 A1 | 6/2015 | Bowers et al. | |
| 2015/0318618 A1 | 11/2015 | Chen et al. | |
| 2015/0318620 A1 | 11/2015 | Black et al. | |
| 2015/0372389 A1 | 12/2015 | Chen et al. | |
| 2015/0380828 A1 | 12/2015 | Black et al. | |
| 2017/0030773 A1 | 2/2017 | Han et al. | |
| 2017/0153528 A1 | 6/2017 | Kim et al. | |
| 2017/0212285 A1 | 7/2017 | Arbabi | |
| 2018/0047774 A1 | 2/2018 | Garreau et al. | |
| 2018/0076521 A1 | 3/2018 | Mehdipour et al. | |
| 2018/0138576 A1 | 5/2018 | Cohen | |
| 2018/0239021 A1 | 8/2018 | Akselrod | |
| 2018/0239213 A1 | 8/2018 | Akselrod | |
| 2018/0241131 A1 | 8/2018 | Akselrod | |
| 2018/0248267 A1 | 8/2018 | Akselrod | |
| 2019/0006533 A1 | 1/2019 | Goldan et al. | |
| 2019/0243208 A1 | 8/2019 | Peng et al. | |
| 2019/0252441 A1 | 8/2019 | Akselrod | |
| 2019/0260124 A1 | 8/2019 | Davoyan | |
| 2019/0285798 A1 | 9/2019 | Akselrod | |
| 2019/0294104 A1 | 9/2019 | Rho et al. | |
| 2019/0377084 A1 | 12/2019 | Sieasman et al. | |
| 2020/0249396 A1* | 8/2020 | Akselrod | G02B 6/42 |
| 2020/0303826 A1 | 9/2020 | Akselrod et al. | |
| 2020/0303827 A1 | 9/2020 | Akselrod et al. | |
| 2021/0141060 A1 | 5/2021 | Akselrod et al. | |
| 2022/0043117 A1 | 2/2022 | Akselrod et al. | |

FOREIGN PATENT DOCUMENTS

| | | |
|---|---|---|
| JP | 2005345402 A | 12/2015 |
| WO | 2018039455 A1 | 3/2018 |
| WO | 2018156643 | 8/2018 |
| WO | 2018156688 | 8/2018 |
| WO | 2018156793 | 8/2018 |
| WO | 2018210776 | 11/2018 |
| WO | 2019191778 A1 | 10/2019 |
| WO | 2020190704 A1 | 9/2020 |
| WO | 2021167657 A2 | 8/2021 |

OTHER PUBLICATIONS

Lumotive, LLC, International Patent Application No. PCT/US20/22599, International Search Report and Written Dpinion dated Jul. 23, 2020, 12 pp.
Askelrod, U.S. Appl. No. 17/098,213, Non-Final Office Action dated Jan. 25, 2021, pp. 1-19.
"Unique" Definition, Meriam-Webster, downloaded Jan. 15, 2021 from https://www.merriam-webster.com/dictionary/unique, 9 pages (Year:2021).
Derickson et al., Self-Mode Locking of a Semiconductor Laser Using Positive Feedback, Feb. 1990, Applied Physics Letters, https://www.researchgate. net/publication/224422317_Self-Mode-Locking_of_a_Semiconductor_Laser_Using_Positive_Feedback>, pp. 7-9.
Lumotive, International Patent Application No. PCT/US20/60601, International Search Report and Written Opinion dated Sep. 9, 2021, 9 pp.
Huang et al., "Gate-tunable conducting oxide metasurfaces," Nano Lett. 16, 5319 (2016).
Pors, Bozhevolnyi, "Plasmonic metasurfaces for efficient phase control in reflection," Opt. Express 21, 27438 (2013).
Arbabi et al., "Subwavelength-thick lenses with high numerical apertures and large efficiency based on high contrast transmitarrays," Nat. Commun. 6, 1 (2014).
Haffner et al., "All-plasmonic Mach-Zehnder modulator enabling optical high-speed communication at the microscale." Nat. Photonics 9, 525-528 (2015).
Li et al., "Poling efficiency enhancement of tethered binary nonlinear optical chromophores for achieving an ultrahigh n3r33 figure-of-merit of 2601 pm V?1" J. Mater. Chem. C 3, 6737 6744 (2015).
Zhang et al., "High performance optical modulator based on electro-optic polymer filled silicon slot photonic crystal waveguide," J. Light. Technol. 34, 2941-2951 (2016).
Xing et al., "Digitally controlled phase shifter using an SOI slot waveguide with liquid crystal infiltration," 27, 1269-1272 (2015).
Borshch et al., "Nanosecond electro-optic switching of a liquid crystal," Phys. Rev. Lett. 111, 107802 (2013).
Chen et al., "Ultra-low viscosity liquid crystal materials," Opt. Mater. Express 5, 655 (2015).
Gholipour et al., "An all-optical, non-volatile, bidirectional, phase-change meta-switch," Adv. Mater. 25, 3050 (2013).
Raoux et al., "Phase change materials and phase change memory," MRS Bull. 39, 703 (2014).

(56) References Cited

OTHER PUBLICATIONS

Rios et al., "Integrated all-photonic non-volatile multi-level memory," Nat. Photonics 9, 725 (2015).
International Application No. PCT/US2018/019107, International Search Report dated Jun. 25, 2018; pp. 1-3.
International Application No. PCT/US2019/022935, International Search Report dated Jul. 4, 2019; pp. 1-5.
U.S. Appl. No. 15/900,676, Requirement for Restriction/Election dated Jun. 25, 2020, pp. 1-7.
Funkhouser, T. et al., 'Survey of Methods for Modeling Sound Propagation in Interactive Virtual Environment Systems,' Princeton University, Department of Computer Science, 2003, pp. 1-53.
U.S. Appl. No. 15/924,744, Non-Final Office Action dated Feb. 15, 2019, pp. 1-11.
U.S. Appl. No. 16/357,288 Non-Final Office Action dated Oct. 7, 2020, pp. 1-8.
Wang, et al., A 60GHz Passive Repeater Array with Endfire Radiation Based on Metal Groove Unit-Cells, 9th European Conference on Antennas and Propagation (EuCAP2015), Apr. 2015, Lisbon, Portugal, 5 pp.

* cited by examiner

INTEGRATED DRIVER AND HEAT CONTROL CIRCUITRY IN TUNABLE OPTICAL DEVICES

TECHNICAL FIELD

This disclosure relates to optical metasurfaces, reflectors, deflectors, and antenna elements. This disclosure also relates to integrated circuits and electronic component fabrication techniques, including complementary metal-oxide-semiconductor (CMOS) technologies.

DETAILED DESCRIPTION

Figure 1:
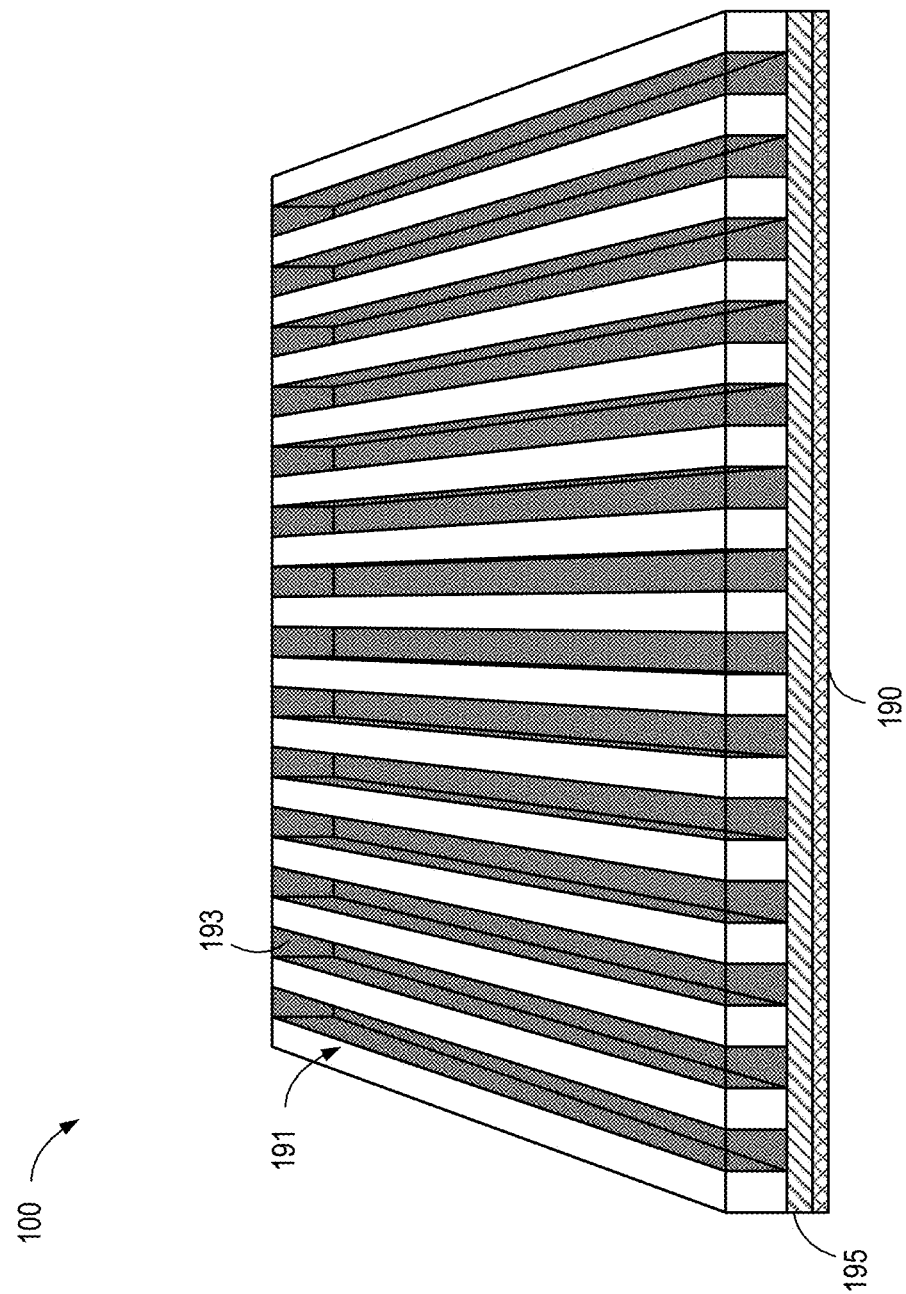
FIG. 1 illustrates an example of a tunable liquid crystal metasurface (LCM), according to one embodiment.

Tunable optical metasurfaces may be used for beamforming, including three-dimensional beam shaping, two-dimensional beam steering, and one-dimensional beam steering. The presently described systems and methods can be applied to tunable metasurfaces utilizing various architectures and designs. In general, a metasurface includes a plurality of optical structures that, together with a tunable dielectric material, can be operated to deflect (e.g., reflect, refract, steer, defocus, focus, converge, diverge, etc.) optical radiation within an operational bandwidth.

According to various embodiments, a tunable optical device comprises a tunable optical metasurface on a substrate with an integrated driver circuit. The substrate may comprise, for example, one or more silicon substrate bases, layers of silicon nitride ($Si_3N_4$), silica ($SiO_2$), tetraethoxysilane (TEOS), and silicon oxynitride (SiON). A complementary metal-oxide-semiconductor (CMOS) integration process and/or the metasurface formation on the substrate may further utilize various dielectrics, doped semiconductor materials, and/or conductor layers. Examples of such materials include, without limitation, aluminum, copper, tantalum, tungsten, and other CMOS-compatible materials.

In some embodiments, the tunable optical device includes a photon shield layer to prevent optical radiation from disrupting the operation of the driver circuit. In some embodiments, the tunable optical device includes a diagnostic circuit to detect and disable defective optical structures of the metasurface. In some embodiments, the tunable optical device includes an integrated heater circuit that maintains a liquid crystal of the metasurface at or above a minimum operating temperature (e.g., a minimum threshold temperature). In some embodiments, the tunable optical device includes an integrated lidar sequencing controller, a steering pattern subcircuit, and a photodetector circuit.

For example, in one embodiment, a tunable optical device comprises a tunable optical metasurface formed on a substrate with a plurality of optical structures. A dielectric material with a tunable refractive index is deposited around the optical structures. In some embodiments, the tunable refractive index material may also be integrated into the optical structures as part of the manufacturing process of the structures. A driver circuit is integrated within the substrate (e.g., within various substrate layers deposited on a silicon substrate base), such as via a semiconductor fabrication process. The driver circuit integrated within the substrate selectively applies a voltage pattern to the plurality of optical structures to control the deflection of incident optical radiation according to a target deflection pattern. For example, a driver circuit may implement phase and amplitude control of optical radiation deflected by the optical structures of the metasurface to implement a target phase and amplitude pattern that corresponds to a target far-field optical radiation pattern (e.g., deflection pattern).

Various specific examples of tunable optical metasurfaces are described herein and depicted in the figures. For example, in one specific embodiment, a tunable optical metasurface includes an array of elongated resonator rails arranged parallel to one another with respect to an optical reflector, such as an optically reflective layer of metal or a Bragg reflector. In such an embodiment, the resonator rails may be formed from metal, a doped semiconductor material, or a dielectric material.

Examples of suitable metals that may be used as optical reflectors and optical structures in a metasurface include, but are not limited to, copper, aluminum, gold, silver, platinum, titanium, and chromium. In embodiments in which the elongated resonator rails are copper, the elongated resonator copper rails may, for example, be formed using a copper damascene manufacturing process, followed by etching the intermetal dielectric and subsequent passivation of the copper. Examples of suitable fabrication processes that can be adapted for use with the presently described systems and methods are described in, for example, U.S. Pat. No. 10,968,522 granted on Apr. 6, 2021, which is hereby incorporated by reference in its entirety.

Liquid crystal, or another refractive index tunable dielectric material, is positioned in the gaps or channels between adjacent resonator rails (e.g., doped semiconductor or metal rails). Liquid crystal is used in many of the examples provided in this disclosure. However, it is appreciated that alternative dielectric materials with tunable refractive indices and/or combinations of different dielectric materials with tunable refractive indices may be utilized instead of liquid crystal in many instances.

For the sake of clarity and to avoid unnecessary repetition, the alternative dielectric materials are not called out in connection with every example provided herein. Nevertheless, the use or substitution of alternative tunable dielectric materials in each of the examples provided herein is explicitly contemplated and encompassed by this disclosure. Examples of dielectric materials with tunable refractive indices suitable for use in the various example metasurfaces described herein include but are not limited to various forms and combinations of liquid crystal, electro-optic polymers, chalcogenide glasses, other phase change materials, and semiconductor materials.

In some embodiments, an optically tunable metasurface includes a two-dimensional array of pillars instead of (or possibly in combination with) elongated rails. Regardless of the exact optical structures utilized in the metasurface, the tunable metasurface may include liquid crystal or another refractive index tunable dielectric material in, around, between, and/or on the optical structures. For example, liquid crystal may fill the channels between resonator rails, fill the gaps between neighboring pillars, and/or form a layer of liquid crystal above the rails or pillars. Examples of suitable metals that may be used as optical reflectors and optical structures in a metasurface include, but are not limited to, copper, aluminum, gold, silver, platinum, titanium, and chromium.

In various embodiments, biasing the liquid crystal in a metasurface with a pattern of voltage biases changes the reflection phase and amplitude of the optical radiation (or transmission phase). For example, in embodiments using reflective-type metasurfaces, biasing the liquid crystal in the metasurface with a pattern of voltage biases can be used to change the reflection phase and amplitude pattern of optical radiation reflected by an underlying reflector layer. Each different voltage pattern applied across the metasurface corresponds to a different reflection phase pattern (or transmission phase pattern in transmissive designs). With a one-dimensional array of optical structures (such as a one-dimensional array of resonator rails), each different reflection phase pattern corresponds to a different steering angle or radiation pattern in a single dimension. A digital or analog controller (controlling current and/or voltage), such as a metasurface driver, may apply a voltage differential bias pattern, such as a blazed grating pattern, to the metasurface to achieve a target beam shaping, such as a target beam steering angle. The term "beam shaping" is used herein in a broad sense to encompass one-dimensional beam steering, two-dimensional beam steering, wavelength filtering, beam divergence, beam convergence, beam focusing, and/or controlled deflection, refraction, reflection, and arbitrary phase and amplitude control of incident optical radiation.

According to various embodiments, the driver circuit of the tunable optical device comprises a one-dimensional passive matrix controller with driver channels integrated within the substrate to individually control each optical structure of the metasurface. In other embodiments, the optical structures of the metasurface are arranged as tiled subsets of optical structures, where each tile shares a set of common control inputs. As described in some of the applications incorporated herein by reference, each tile of optical structures may include tens, hundreds, thousands, or millions of optical structures. Each tile may be controlled by a common set of control lines, such that the number of unique control inputs for the metasurface is much fewer than the total number of optical structures in the metasurface. The driver circuit may include control lines or driver channels integrated within the substrate to control each individual tile of optical structures.

In other embodiments, the driver circuit (e.g., a CMOS-integrated driver circuit) may be embodied as an active switch-matrix controller that is switchable to individually control each metal optical structure of the metasurface. For example, each control output of the active switch-matrix controller may be dynamically switched to control a different control input of the metasurface. The active switch-matrix controller may, for example, utilize AND gates, OR gates, multiplexer digital logic gates, inverse multiplexer digital logic gates, and/or other switching elements to dynamically address any number of individual optical structures or tiles of optical structures.

In some embodiments, a metasurface may include a relatively large volume (e.g., a relatively thick layer) of liquid crystal above the optical elements. In such embodiments, the large volume of liquid crystal above the metasurface that is not well aligned can reduce the optical performance of the metasurface due to the uncontrolled rotation of incident light polarization. In such embodiments, a transparent electrode, such as an indium tin oxide (ITO) electrode layer, may be formed or otherwise positioned on a surface of a cover (e.g., a glass cover) that seals the liquid crystal around the optical elements. The transparent electrode can be voltage controlled to orient the liquid crystal above the metasurface to improve the optical performance of the tunable optical device. In various embodiments, the driver circuit is integrated into the substrate and further configured to control the voltage level of the transparent electrode of such metasurface embodiments.

In some embodiments, a tunable optical device includes an integrated photodetector circuit. The integrated photodetector circuit may be, for example, integrated as part of a CMOS circuit. The integrated photodetector circuit may be used to detect the defective operation of the tunable optical device and respond by providing an alert or automatically disabling the tunable optical device and/or the metasurface thereof. For example, the integrated photodetector circuit may detect that the metasurface is not properly steering in response to applied voltage patterns. In some embodiments, the integrated photodetector circuit may detect that a transmitted power level exceeds a threshold value. The threshold value may be based on a maximum safe optical power level, a maximum allowed power level, and/or a maximum authorized power level.

In some embodiments, a tunable optical device includes a tunable optical metasurface on a substrate with an integrated diagnostic circuit. The diagnostic circuit may be integrated within the substrate (e.g., within various substrate layers deposited on a silicon substrate base), such as via a CMOS fabrication process. The diagnostic circuit integrated within the substrate operates to test one or more tuning characteristics and/or one or more electrical characteristics of at least some of the optical structures, identify one or more of the optical structures as being defective, and disable defective optical structures. For example, the diagnostic circuit may test an electrical characteristic of each optical structure or groupings of optical structures to identify defects as part of factory calibration and/or in the field. The testing and disabling may be done once, upon startup, at regular intervals, or on-demand.

For example, a configuration or setting of a driver circuit may be updated or otherwise modified to drive defective optical structures with a static voltage (e.g., a zero or null voltage) and/or a voltage equal to the voltage used to drive adjacent, non-deflective optical structures, which may vary during operation according to the target deflection pattern at any given time.

In some embodiments, the integrated diagnostic circuit may include or utilize an integrated photodetector. For instance, the integrated diagnostic circuit may cause individual optical structures or subsets of optical structures to deflect optical radiation according to a target deflection pattern. The integrated photodetector may be utilized to confirm that the expected target deflection pattern was achieved. The integrated diagnostic circuit may detect a defective optical structure or a defective subset of optical structures based on a failure of the integrated photodetector to confirm the transmission of the target deflection pattern. In other embodiments, the diagnostic circuit may apply a voltage to individual rails and measure an electric characteristic thereof to determine proper functionality or a defective state. For example, the diagnostic circuit may measure a resistance, a voltage, and/or a current response to an applied voltage value.

In various embodiments, a tunable optical device includes a photon shield layer between the tunable optical metasurface and the driver circuit and/or between the optical metasurface and the diagnostic circuit. In some embodiments, the tunable optical device may comprise metasurface control circuitry that includes both a driver circuit and a diagnostic circuit. The photon shield may, for example, comprise a metal layer (e.g., copper, aluminum, etc.) or a dielectric layer to block photons not deflected by the metasurface from contacting and potentially disrupting the operation of the driver circuit and/or diagnostic circuit.

In embodiments in which the photon shield comprises a dielectric layer, the photon shield may comprise graphite, carbon, or other light-absorbing or light-reflecting materials.

In other embodiments, the photon shield may be embodied as a Bragg reflector. In some embodiments, the photon or optical shield may comprise a low-K dielectric, an organic modified silane-based dielectric, a polymer (e.g., polyimide), amorphous carbon, graphite, or other material to absorb or deflect light to prevent the light from disrupting the operation of integrated circuits, including without limitation integrated driver circuits of the metasurface.

In various embodiments, a tunable optical device includes a heater circuit integrated with the substrate in addition to or as part of a driver circuit and/or diagnostic circuit. The heater circuit operates to maintain the tunable refractive index material (e.g., liquid crystal) at or above a minimum threshold operating temperature. For example, the heater circuit may be implemented as part of a CMOS fabrication process with an automatic temperature-controlled feedback loop that includes a heating resistor. One or more heat distribution plates may be deposited during the CMOS fabrication process to distribute the heat more evenly and/or more quickly to the liquid crystal (or other tunable refractive index materials). The heater circuit may comprise, for example, a resistor and/or heat distribution plates fabricated with titanium nitride (TiN) or tantalum nitride (TaN). In some embodiments, the heater layer may comprise: semiconductor materials such as, but not limited to, silicon carbide (SiC), and/or aluminum nitride (AlN). The heater circuit may also comprise conductive materials such as, but again not limited to, tantalum (Ta), palladium (Pt), copper magnesium nitride (CuMnNi), graphite, amorphous carbon, graphene, Molybdenum disilicide ($MoSi_2$) or other silicides, and/or various polymers.

In various embodiments, the driver circuit may comprise a steering pattern subcircuit that stores voltage patterns corresponding to defined deflection patterns. In some embodiments, the subcircuit may store encrypted voltage patterns, while in other embodiments the subcircuit may store unencrypted voltage patterns. In some embodiments, the subcircuit may calculate the desired voltage patterns based on a programmable algorithm based on high level user inputs such as the desired angle or angles. The tunable optical device may be configured to only implement the stored voltage patterns to prevent or reduce the likelihood of dangerous or undesirable optical deflection patterns. For example, external inputs or control signals to drive the tunable optical metasurface may be mapped to a beam steering table to look up the corresponding voltage pattern to be applied to the optical structures of the metasurface. The tunable optical device may be configured to transmit only those voltage patterns that are stored within the steering pattern subcircuit (e.g., an encrypted beam steering table to map beam steering control inputs to a specific voltage pattern to be applied to a metasurface).

In some embodiments, a tunable optical device includes a light detection and ranging (lidar) sequencing controller integrated within the substrate (e.g., via a CMOS fabrication process, as part of an integrated driver circuit, as part of an integrated diagnostic circuit, and/or the like). The lidar sequencing controller operates to sequentially drive the tunable optical metasurface according to a sequence of defined deflection patterns for lidar detection (e.g., via a lidar detector).

In other embodiments, the tunable optical device may include integrated control circuitry related to other intended functions and applications of the tunable optical device. For example, the control circuitry may be integrated within the substrate of the tunable optical device relating to communication control, optical computing control, communication control, optical sensing control, laser driver, etc.

It is appreciated that the metasurface technologies described herein may incorporate or otherwise leverage prior advancements in surface scattering antennas, such as those described in U.S. Patent Publication No. 2012/0194399; U.S. Patent Publication No. 2019/0285798, U.S. Patent Publication 2018/0239213, and U.S. Patent Publication No. 2018/0241131, which publications are hereby incorporated by reference in their entireties. Additional elements, applications, and features of surface scattering antennas that feature a reference wave or feed wave are described in U.S. Patent Publication Nos. 2014/0266946, 2015/0318618, 2015/0318620, 2015/0380828, 2015/0162658, and 2015/0372389, each of which is hereby incorporated by reference in its entirety. Specific descriptions of optical resonant antenna configurations and feature sizes are described in U.S. patent application Ser. Nos. 15/900,676, 15/900,683, 15/924,744, and 17/685,621, each of which is hereby incorporated by reference in its entirety.

Throughout this disclosure, examples of transmitting (or receiving) embodiments are provided with the understanding that reciprocal receiving (or transmitting) embodiments are also contemplated. Similarly, it is understood that a system may operate as only a transmitter, only a receiver, simultaneously as a transmitter and receiver, with a time-multiplexed transmitter/receiver, with a frequency-multiplexed transmitter/receiver, with the first metasurface acting as a transmitter and a second metasurface acting as a receiver, or another transmit/receive configuration or operation technique. Similarly, many of the examples are described in terms of modifying a reflection phase pattern of a reflective-type metasurface. However, it is appreciated that many of the approaches, techniques, systems, methods, and principles taught herein can be applied to transmissive-type metasurfaces as well. Accordingly, each embodiment in which a reflective-type metasurface is described should be understood as implicitly teaching a corresponding embodiment using a transmissive-type metasurface.

Additionally, many of the described embodiments of metasurfaces are described in terms of controlling, tuning, or modifying phase patterns (e.g., reflection phase patterns or transmission phase patterns). However, many of the embodiments may be used in conjunction with metasurfaces in which the optical elements are tuned or adjusted to control (i) the reflection/transmission phase, (ii) the reflection/transmission amplitude, or (iii) the reflection/transmission phase and the reflection/transmission amplitude. Accordingly, any of a wide variety of metasurfaces may be utilized in any of the embodiments described herein that operate to control the complex phase and/or complex amplitude of the reflected or transmitted optical radiation. Accordingly, while specific examples are described and illustrated herein, it is understood that the various embodiments may be modified or adapted for use with alternative embodiments of optical metasurfaces and are not limited to the specifically described and illustrated examples.

The presently described embodiments support optical bandwidths and are, for example, suitable for optical sensing systems such as LiDAR, optical communications systems, optical computing systems, optical power transfer, and displays. For example, the systems and methods described herein can be configured with metasurfaces that operate in the sub-infrared, mid-infrared, high-infrared, and/or visible-frequency ranges (generally referred to herein as "optical"). Given the feature sizes needed for sub-wavelength optical antennas and antenna spacings (e.g., sub-wavelength interelement spacings), the described metasurfaces may be manufactured using micro-lithographic and/or nano-lithographic processes, such as fabrication methods commonly used to manufacture CMOS integrated circuits.

Some of the infrastructure that can be used with embodiments disclosed herein is already available, such as general-purpose computers, computer programming tools and techniques, digital storage media, and communication links. Many of the systems, subsystems, modules, components, and the like that are described herein may be implemented as hardware, firmware, and/or software. Various systems, subsystems, modules, and components are described in terms of the function(s) they perform because such a wide variety of possible implementations exist. For example, it is appreciated that many existing programming languages, hardware devices, frequency bands, circuits, software platforms, networking infrastructures, and/or data stores may be utilized alone or in combination to implement a specific control function.

It is also appreciated that two or more of the elements, devices, systems, subsystems, components, modules, etc. that are described herein may be combined as a single element, device, system, subsystem, module, or component. Moreover, many of the elements, devices, systems, subsystems, components, and modules may be duplicated or further divided into discrete elements, devices, systems, subsystems, components, or modules to perform subtasks of those described herein. Any of the embodiments described herein may be combined with any combination of other embodiments described herein.

To the extent used herein, a computing device, system, subsystem, module, driver, or controller may include a processor, such as a microprocessor, a microcontroller, logic circuitry, or the like. A processor may include one or more special-purpose processing devices, such as application-specific integrated circuits (ASICs), programmable array logic (PAL), programmable logic array (PLA), a programmable logic device (PLD), field-programmable gate array (FPGA), or other customizable and/or programmable device. The computing device may also include a machine-readable storage device, such as non-volatile memory, static RAM, dynamic RAM, ROM, CD-ROM, disk, tape, magnetic, optical, flash memory, or another machine-readable storage medium. Various aspects of certain embodiments may be implemented or enhanced using hardware, software, firmware, or a combination thereof.

The components of some of the disclosed embodiments are described and illustrated in the figures herein to provide specific examples. Many portions thereof could be arranged and designed in a wide variety of different configurations. Furthermore, the features, structures, and operations associated with one embodiment may be applied to or combined with the features, structures, or operations described in conjunction with another embodiment. In many instances, well-known structures, materials, or operations are not shown or described in detail to avoid obscuring aspects of this disclosure. The right to add any described embodiment or feature to any one of the figures and/or as a new figure is explicitly reserved.

The embodiments of the systems and methods provided within this disclosure are not intended to limit the scope of the disclosure but are merely representative of possible embodiments. In addition, the steps of a method do not necessarily need to be executed in any specific order, or even sequentially, nor do the steps need to be executed only once.

As previously noted, descriptions and variations described in terms of transmitters are equally applicable to receivers, and vice versa.

FIG. 1 illustrates an example of a tunable liquid crystal metasurface (LCM) 100, according to one embodiment. The tunable LCM 100 can, for example, be used as part of a solid-state optical transmitter system, receiver system, or transceiver system. As illustrated, the tunable LCM 100 includes an optically reflective substrate 190 and a dielectric layer 195. A plurality of elongated rails 191 are arranged at sub-wavelength intervals on the optically reflective substrate 190 and electrically separated by the dielectric layer 195. The elongated rails 191 may be referred to herein as "resonator rails" because the gaps between them (filled with liquid crystals or other dielectrics that can be tuned to adjust a refractive index) are resonant within the optical operational bandwidth of the LCM. Liquid crystal or another refractive index tunable dielectric material 193 is positioned between the elongated rails 191. A controller or metasurface driver (not illustrated) may apply voltage differential bias patterns to the elongated rails 191 to modify a reflection phase of the resonator (or transmission phase of the resonator in transmissive designs). The combination of phase delays imparted from all the resonators creates constructive interference in the desired beam steering direction.

Additional descriptions, variations, functionalities, and usages for optical metasurfaces are described in U.S. Pat. No. 10,451,800 granted on Oct. 22, 2019, entitled "Plasmonic Surface-Scattering Elements and Metasurfaces for Optical Beam Steering;" U.S. Pat. No. 10,665,953 granted on May 26, 2020, entitled "Tunable Liquid Crystal Metasurfaces;" and U.S. Pat. No. 11,092,675 granted on Aug. 17, 2021, entitled "Lidar Systems based on Tunable Optical Metasurfaces," each of which is hereby incorporated by reference in its entirety. Many of the metasurfaces described in the above-identified U.S. patents include parallel rails positioned above a two-dimensional or planar reflective surface or layer.

Figure 2A:
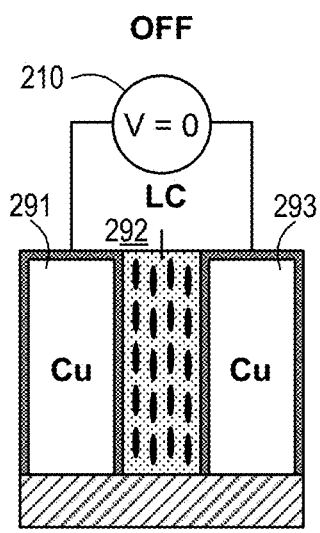
FIG. 2A illustrates the liquid crystal between two metal rails aligned in a first direction to provide a first refractive index without any applied voltage, according to one embodiment.

FIG. 2A illustrates a block diagram of liquid crystal 292 between two metal rails 291 and 293, according to one embodiment. As illustrated, the liquid crystal is aligned in a first direction corresponding to a first refractive index without voltage applied by the voltage controller 210.

Figure 2B:
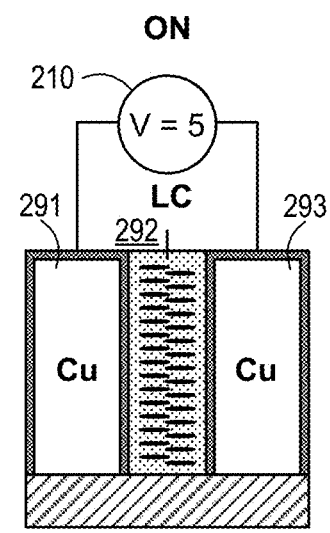
FIG. 2B illustrates the liquid crystal between the two metal rails aligned in a second direction to provide a second refractive index with an applied voltage of 5 volts, according to one embodiment.

FIG. 2B illustrates the block diagram with liquid crystal 292 between the two metal rails 291 and 293 aligned in a second direction that results in a second refractive index based on an applied voltage of 5 volts, according to one embodiment.

Figure 2C:
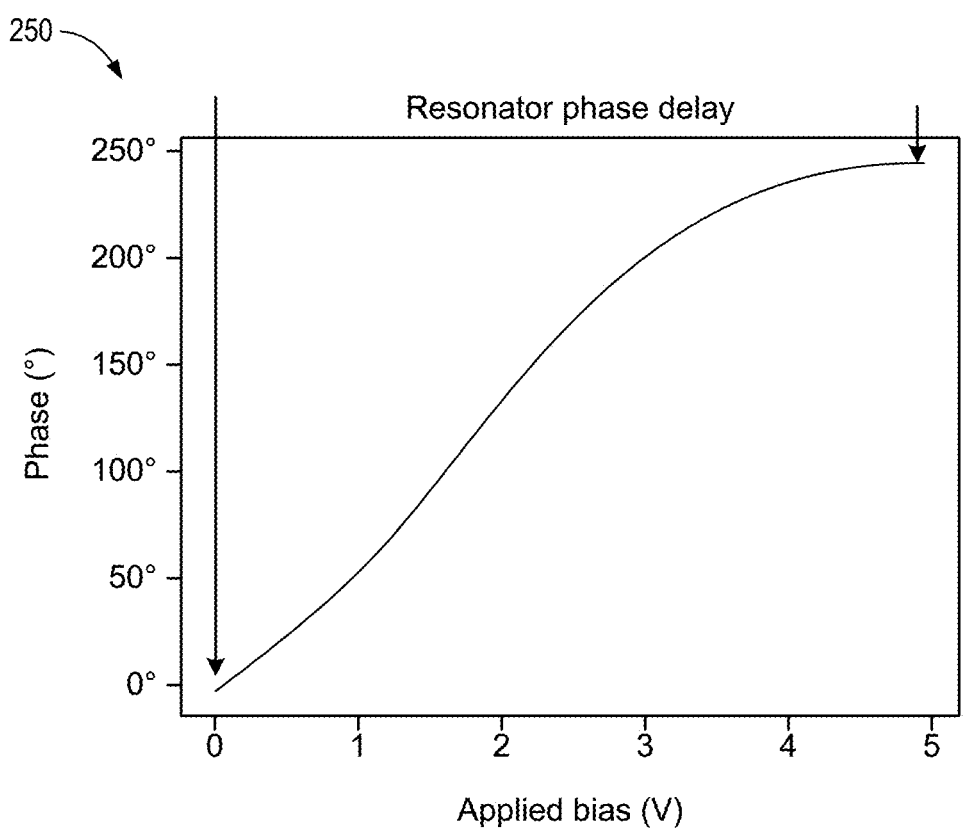
FIG. 2C illustrates a graph of a phase response of an LCM unit cell with respect to applied voltage values, according to one embodiment.

FIG. 2C illustrates a graph 250 of a phase response of an LCM unit cell with respect to applied voltage values, according to one embodiment.

Figure 3A:
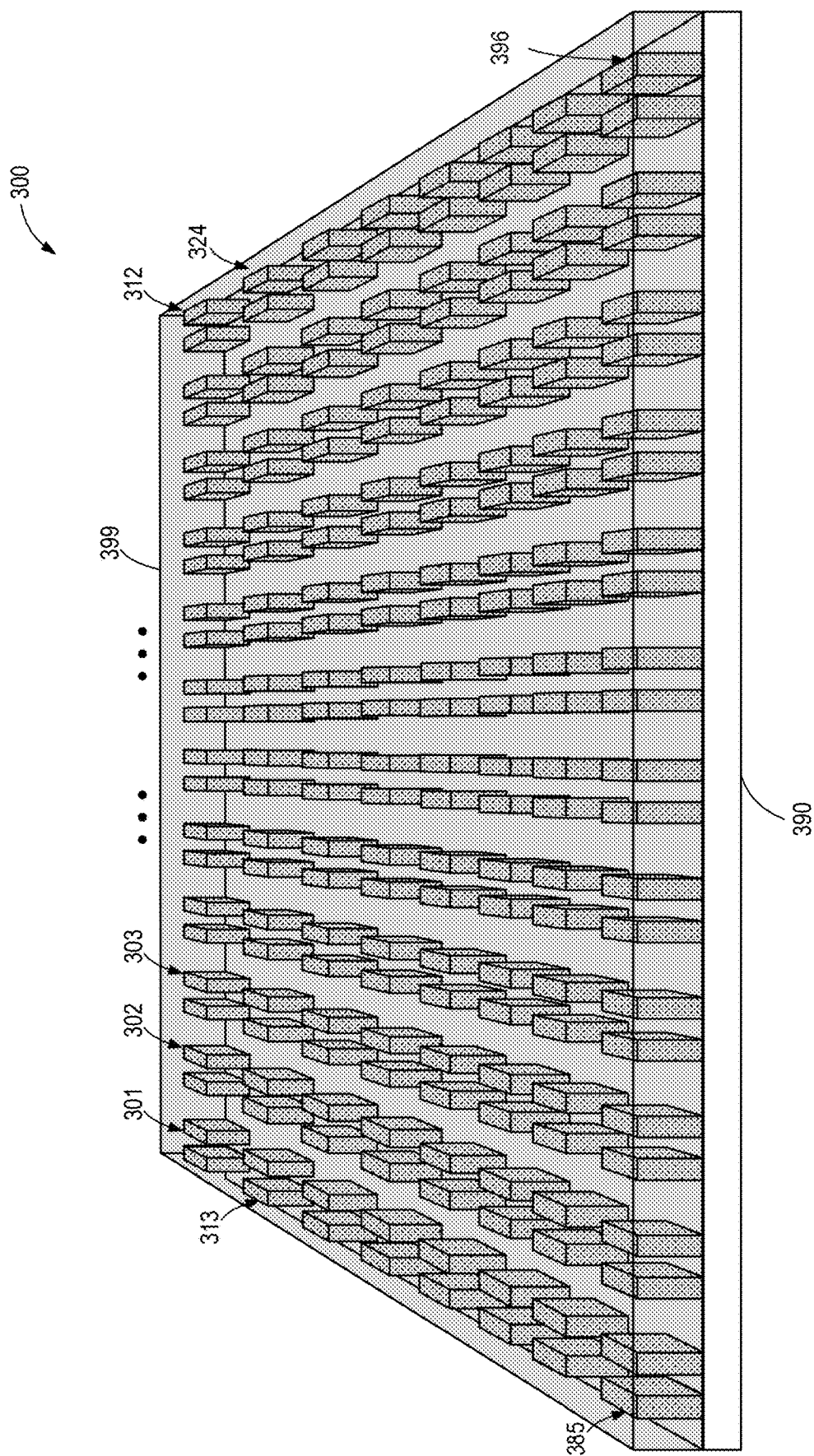
FIG. 3A illustrates a simplified embodiment of an optical surface scattering device with a two-dimensional array of pillars with an adjustable refractive index material around pairs of pillars, according to one embodiment.

FIG. 3A illustrates a simplified embodiment of an optical surface scattering device 300 with one hundred and ninety-two pillar-shaped dielectric or conductive members 301-396 (only some of which are labeled to avoid obscuring the drawing). As illustrated, an adjustable refractive index material 399 forms an encompassing layer around the pairs of pillars 301-396, including above the pillars and in between the pillar pairs.

Figure 3B:
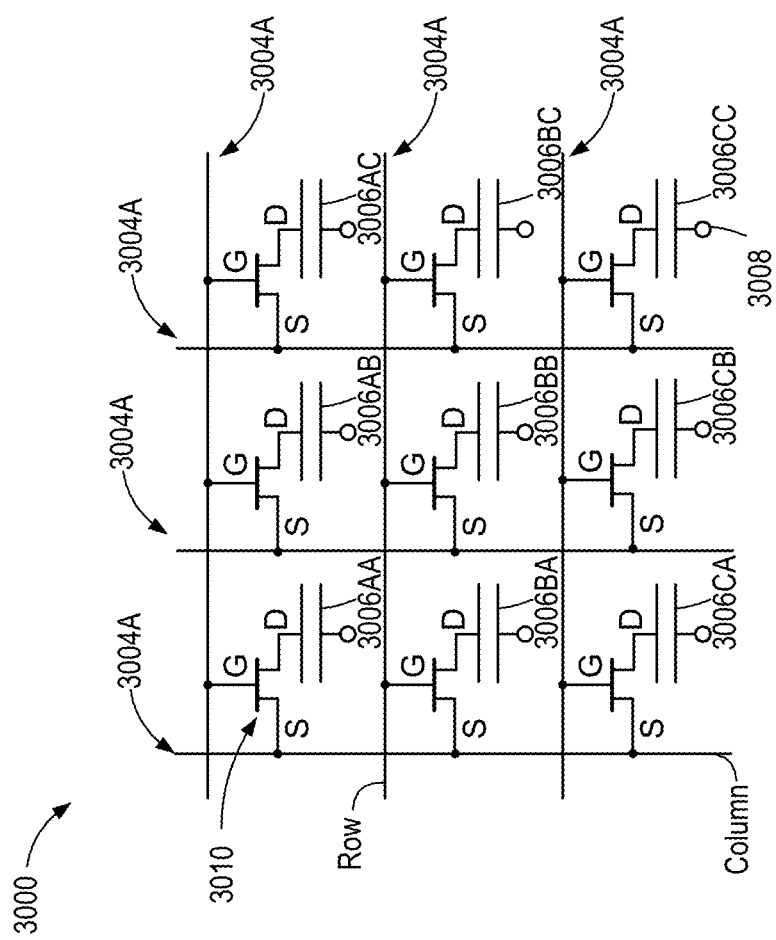
FIG. 3B illustrates a diagram of a two-dimensional, active-matrix circuit to address the two-dimensional array of pillars in FIG. 3A, according to one embodiment.

FIG. 3B illustrates an example diagram of a two-dimensional, active-matrix circuit 3000 that can, as described herein, be integrated within substrate layers of the tunable optical surface scatter device 300 of FIG. 3A, according to one embodiment. As illustrated the two-dimensional matrix control circuitry is used to individually address each of the tunable pillar-shaped dielectric or conductive members 301-396 of FIG. 3A, which are modeled as capacitors 3006AA, 3006AB, 3006AC, 3006BA, 3006BB, 3006BC, 3006CA 3006CB, 3006CC (collectively referred to as tunable elements 3006) in the diagram. Each of the modeled tunable elements 3006 is connected to a transistor 3010, such as an integrated CMOS transistor, and/or additional integrated circuit components as described herein.

In the illustrated example, each transistor 3010 includes a gate (labeled with a "G") electrically coupled to the respective row line 3002, a source (labeled with an "S") electrically coupled to a respective column line 3004, and a drain (labeled with a "D") electrically coupled to one conductor of a respective tunable element 3006. An opposite conductor of each tunable element 3006 connects to ground 3008. In the active matrix addressing scheme, the row lines 3002 are digitally controlled, for example, a binary control, "on" and "off."

The column lines 3004 are controlled by analog voltages. When a row line 3002 is in an "off" state, the tunable element 3006 (modeled as a capacitor) holds the voltage for a period of time. When the row line 3002 is in an "on" state, the voltage of the tunable element 3006 can be changed. During operation, the digital row line 3002 activates the gates of all transistors in a specific row. The column line 3004 applies an analog voltage to the tunable element 306 in a specific column through the drains of the transistors 3010. When the row line 3002 changes the CMOS transistors in the specific row to be an "off" state, the tunable element 306 keep the applied analog voltage due to the inherent capacitance of the tunable element 306. In some embodiments additional capacitive elements may be added to each control element of the integrated circuit to increase the time that the applied analog voltage is maintained.

Figures 4A, 4B:
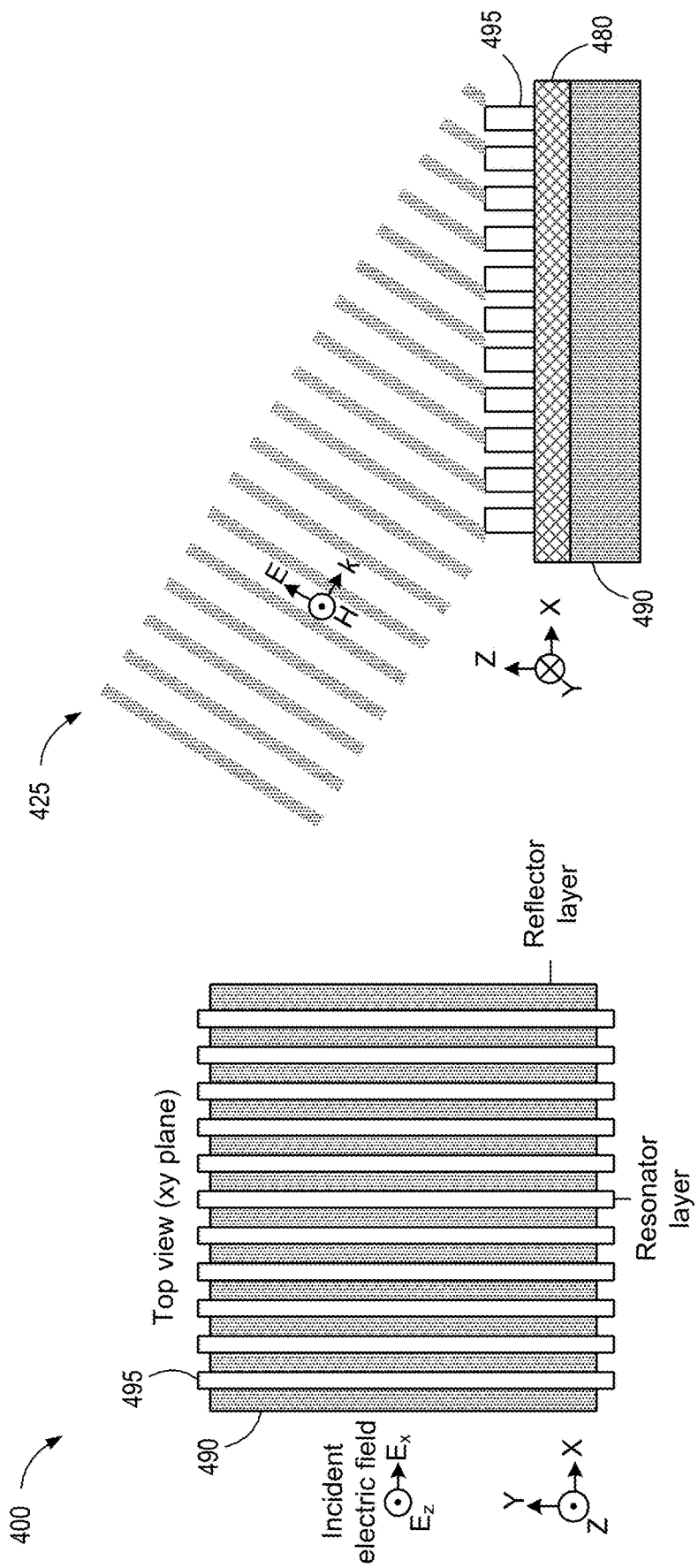
FIG. 4A illustrates a top view of parallel resonator rails arranged on a planar reflector surface, according to one embodiment.
FIG. 4B illustrates an optical wavefront incident on the resonator rails arranged on the planar reflector surface, according to one embodiment.

FIG. 4A illustrates a top view of parallel resonator rails 495 (shown as white rails) arranged on a planar reflector surface 490 of an LCM 400, according to one embodiment. In the illustrated embodiment, the optically reflective backplane is a planar reflector surface 490, such as a copper or aluminum layer.

FIG. 4B illustrates an optical wavefront 425 incident on the resonator rails 495 arranged on the planar reflector surface 490, according to one embodiment. As illustrated, a dielectric layer 480 electrically isolates the resonator rails 495 from the planar reflector surface 490. A controller may apply a voltage bias pattern to the resonator rails 495 to attain a target reflection pattern of the incident optical wavefront 425. With the planar reflector surface 490, electrical connections from each rail (or each subset of rails) may be made from the edges of the LCM or through insulated holes formed in the planar reflector surface 490.

Figures 5A, 5B:
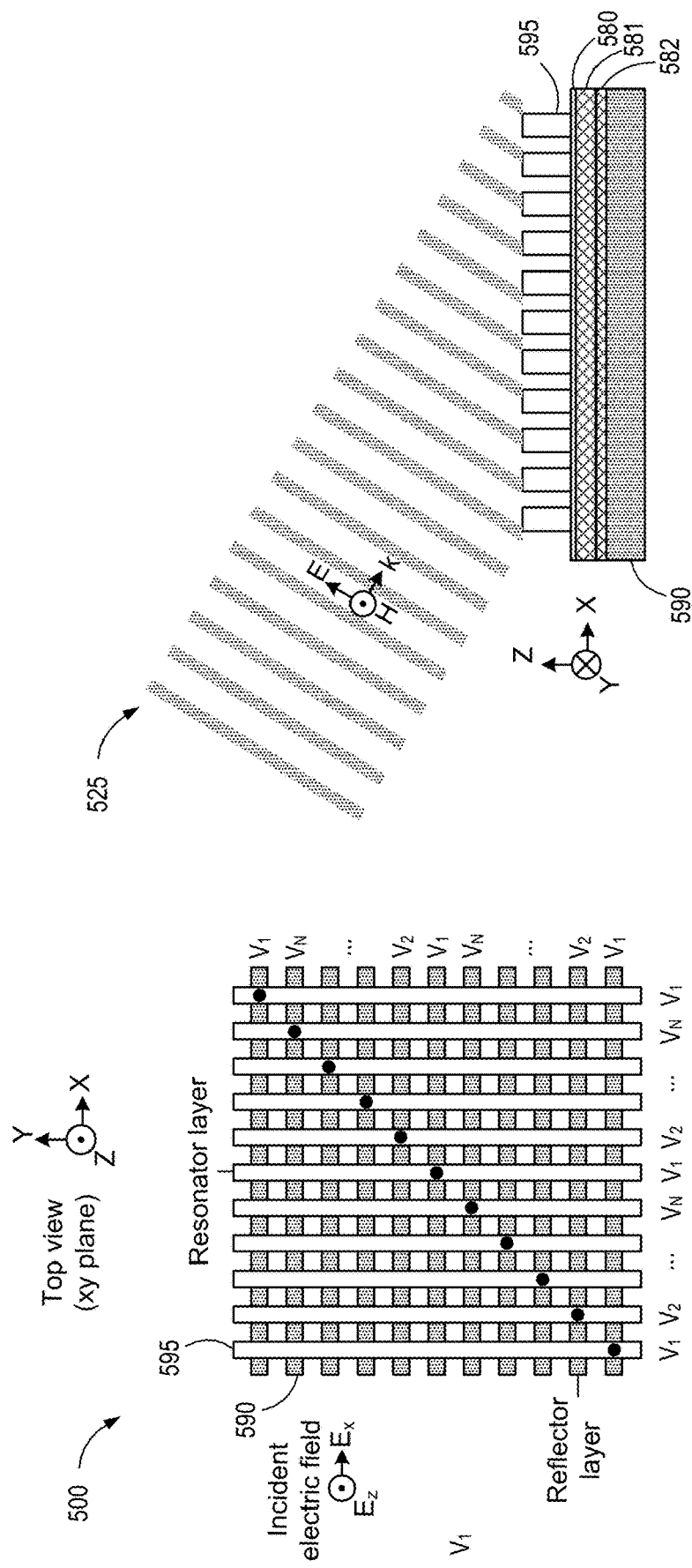
FIG. 5A illustrates a top view of parallel resonator rails arranged on a cross-backplane reflector, according to one embodiment.
FIG. 5B illustrates an optical wavefront incident on the resonator rails and parallel to the cross-backplane reflector, according to one embodiment.

FIG. 5A illustrates a top view of an LCM 500 with parallel resonator rails 595 arranged on a cross-backplane reflector 590 that is formed as a plurality of optically reflective rails extending perpendicular to the direction of the parallel resonator rails 595, according to one embodiment.

FIG. 5B illustrates an optical wavefront 525 incident on the resonator rails 595 and parallel to the cross-backplane reflector 590, according to one embodiment. In the illustrated embodiment, the resonator rails 595 are insulated from the underlying optical reflectors by insulating layers 580, 581, and 582. Insulating layers 580, 581, and 582 may be a single insulating layer or multiple insulating layers (e.g., combined as one or two layers instead of the illustrated three layers). Optical radiation incident on the LCM that is perpendicular to the parallel elongated optical reflectors forming the cross-backplane reflector 590 is reflected in the same manner as if the optically reflective backplane were a solid layer. As described herein, the elongated optical reflectors or the spaces between the elongated optical reflectors can be used to route electrical connections between a controller and the resonator rails 595.

As described herein, a plurality of vias may be patterned in the optically transmissive dielectric insulating layers 580, 581, and 582 at locations between adjacent optical reflectors in the cross-backplane reflector 590 (e.g., for wire routing between the elongated optical reflectors of the cross-backplane reflector 590 to the resonator rails 595). Alternatively, vias may be patterns in the optically transmissive dielectric insulating layers 580, 581, and 582 at locations directly above the optical reflectors in the cross-backplane reflector 590 (e.g., for embodiments in which elongated optical reflectors serve to electrically connect a controller to the resonator rails 595).

As described herein, a controller may apply a voltage to each of the resonator rails 595 via electrical connections therebetween. In some embodiments, the electrical connections may comprise wires, traces, or other conductive elements that extend from the resonator rails 595 through vias in the optically transmissive dielectric insulating layers 580, 581, and 582 and then between adjacent elongated optical reflectors of the cross-backplane reflector to the controller (or a connected control layer or printed circuit board (PCB) layer.

In other embodiments, each resonator rail 595 may be connected to one or more of the elongated optical reflectors of the cross-backplane reflector 590 through vias in the optically transmissive dielectric insulating layers 580, 581, and 582. In such embodiments, the controller may apply a voltage differential pattern to the resonator rails 595 by applying a corresponding voltage to the electrically connected elongated optical reflectors of the cross-backplane reflector. As described herein, a controller may selectively apply patterns of voltage differentials between adjacent resonator rails 595 to generate corresponding reflection phase patterns for selective beam steering of the incident optical radiation of the optical wavefront 525.

Figures 5C, 5D:
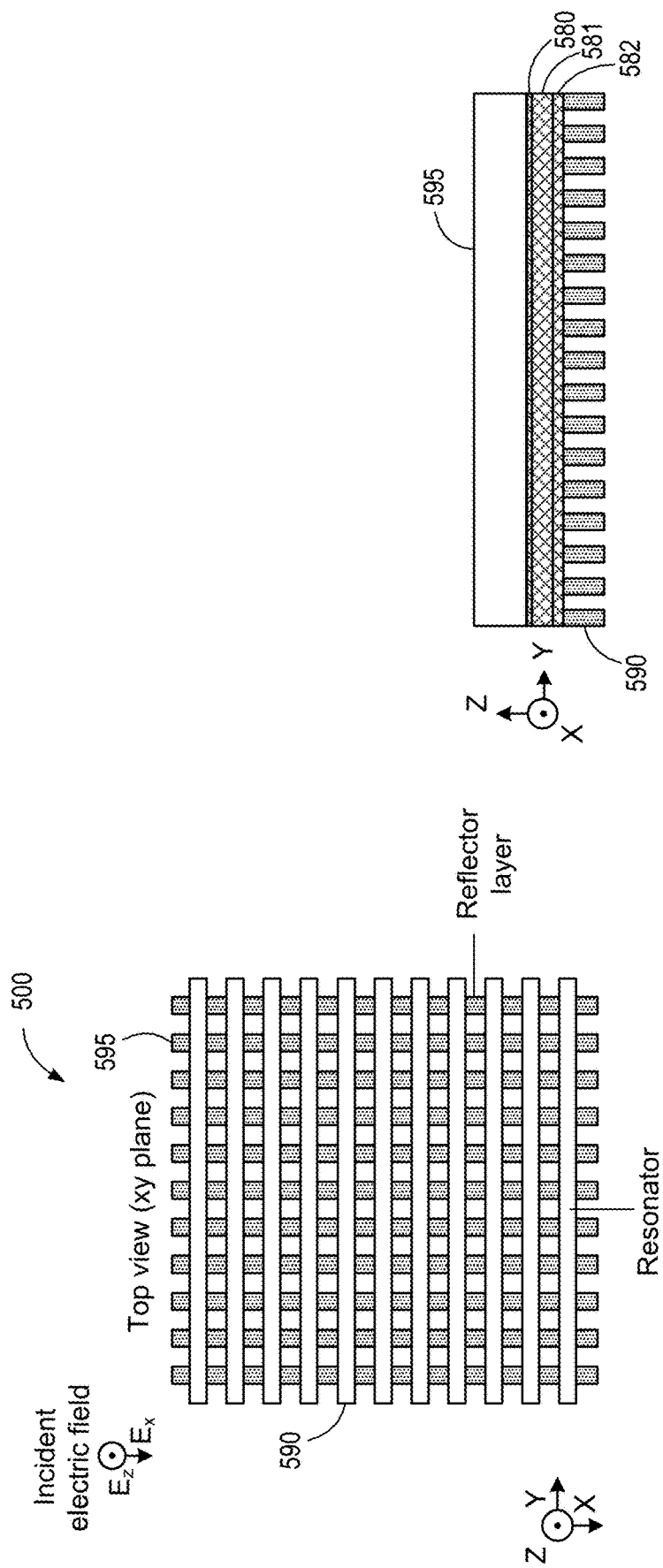
FIG. 5C illustrates a top view of the parallel resonator rails arranged on the cross-backplane reflector similar to that of FIG. 5A, but rotated 90-degrees, according to one embodiment.
FIG. 5D illustrates another side view of the parallel reflector elements of the cross-backplane reflector, according to one embodiment.

FIG. 5C illustrates a top view of the parallel resonator rails 595 of the LCM 500 arranged on the cross-backplane reflector similar to that of FIG. 5A, according to one embodiment. The LCM 500 in FIG. 5C is the same LCM 500 illustrated in FIG. 5A, but the view is rotated 90 degrees to facilitate visualization of FIG. 5D FIG. 5D illustrates another side view of the parallel, elongated optical reflectors of the cross-backplane reflector 590, according to one embodiment. As illustrated in the side view of the LCM 500, a single "end" resonator rail 595 is visible and electrically isolated from the elongated optical reflectors of the cross-backplane reflector 590 by insulating layers 580, 581, and 582. Examples of suitable resonator rails 595 include dielectric rails, doped silicon rails, metal rails, and combinations thereof. Examples of suitable metal rails include but are not limited to, metal rails comprising one or more of aluminum, gold, copper, silver, platinum, titanium, and chromium. Similarly, the elongated optical reflectors of the cross-backplane reflector 590 may comprise or consist of one or more of aluminum, gold, copper, silver, platinum, titanium, and chromium. The resonator rails 595 may be spaced apart from one another by less than one-half of a wavelength within an operational bandwidth. Similarly, the elongated optical reflectors of the cross-backplane reflector 590 may also be spaced from one another by less than one-half of a wavelength within the operational bandwidth.

Figure 6:
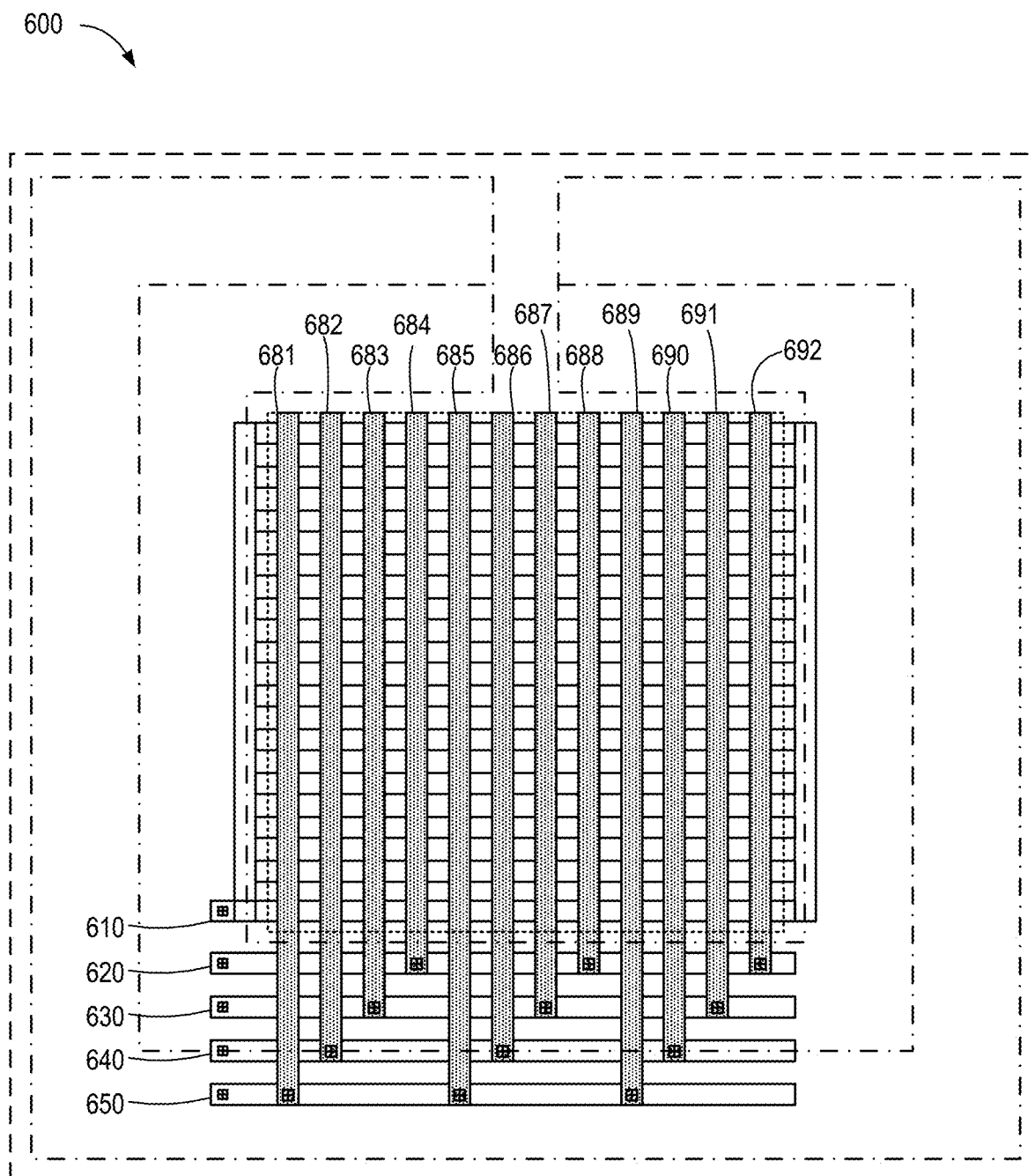
FIG. 6 illustrates a layout diagram of a portion of a tunable optical device with a cross backplane reflector using edge routing for connecting a driver circuit integrated within a substrate, according to one embodiment.

FIG. 6 illustrates a layout diagram 600 of a portion of a tunable optical device with a cross backplane reflector (horizontal rails) using edge routing for connecting a driver circuit integrated within a substrate, according to one embodiment. As illustrated, the cross backplane reflector may include horizontal rails 610, 620, 630, 640, and 650, each of which is connected to multiple reflector rails 681-692. Tiled arrangements and edge routing of reflector rails using cross backplane reflectors are described in additional detail in U.S. patent application Ser. No. 17/685,621 filed on Mar. 3, 2022, titled "Liquid Crystal Metasurfaces with Cross-Backplane Optical Reflectors," which application is hereby incorporated by reference in its entirety. As described therein, in-aperture routing may be utilized instead of edge routing in some embodiments.

Figure 7A:
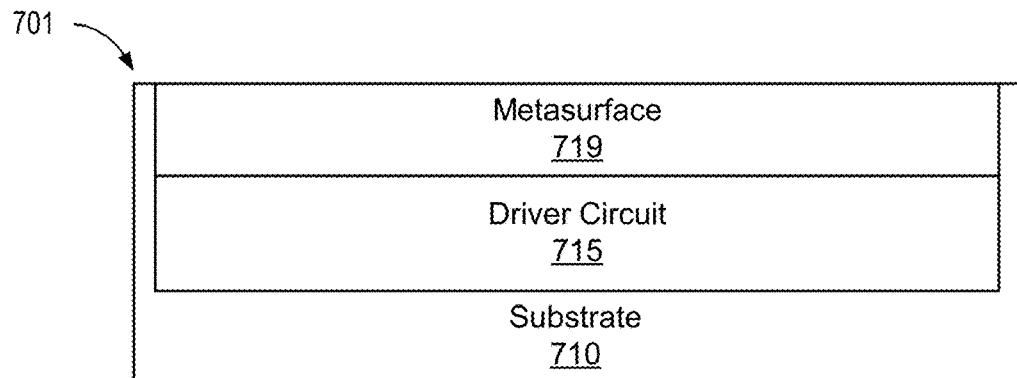
FIG. 7A illustrates a simplified block diagram of a tunable optical device, according to one embodiment.

FIG. 7A illustrates a simplified block diagram of a tunable optical device 701 that includes a metasurface 719 on a substrate 710. A driver circuit 715 is integrated within the substrate 710. According to various embodiments, the substrate 710 may include a silicon substrate base layer and one or more other layers of silicon nitride ($Si_3N_4$), silica ($SiO_2$), tetraethoxysilane (TEOS), silicon oxynitride (SiON), and/or other materials useful for forming the metasurface 719, the driver circuit 715, vias or other electrical conductors, and the like. According to various embodiments, the driver circuit is integrated within the substrate (e.g., beneath the metasurface or on an edge of the metasurface). For example, the driver circuit 715 and the metasurface 719 may both be formed during various stages of a CMOS fabrication process that includes any number of deposition, masking, and etching steps.

The metasurface 719 may be formed and configured according to any of a wide variety of configurations and adaptations, including any one of the various embodiments described in the patent applications referenced and incorporated by reference herein. Additional examples of suitable metasurfaces and manufacturing techniques are described in U.S. patent application Ser. No. 17/697,888 filed on Mar. 17, 2022, titled "Tunable Optical Device Configurations and Packaging," which application is hereby incorporated by reference in its entirety.

Figure 7B:
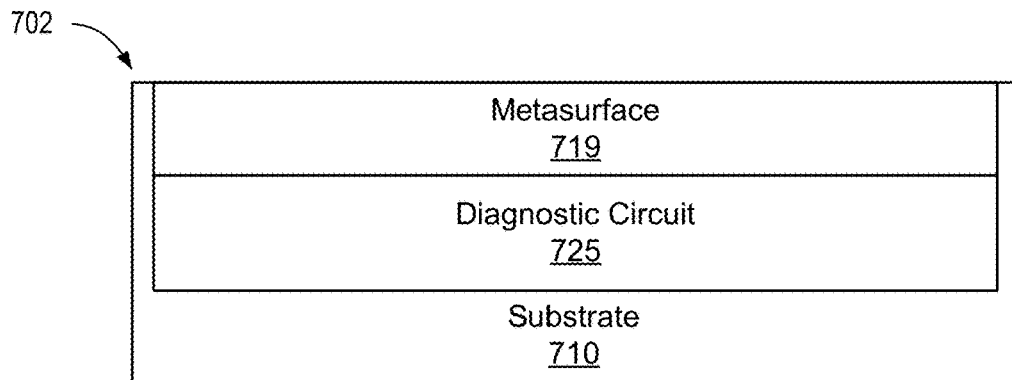
FIG. 7B illustrates a simplified block diagram of another embodiment of a tunable optical device.

FIG. 7B illustrates a simplified block diagram of another embodiment of a tunable optical device 702, according to one embodiment. The illustrated optical device 702 may include a driver that is off-chip and/or otherwise externally connected to the metasurface 719. However, the tunable optical device 702 includes a diagnostic circuit 725 that is integrated within the substrate 710 along with the metasurface. The diagnostic circuit 725 may be configured to automatically diagnose the functionality of the metasurface 719 once after manufacturing, automatically when powered on, in response to an external request for diagnostic testing to be performed, periodically according to a defined schedule, and/or at random.

The diagnostic circuit 725 may test an electrical characteristic (or an optical deflection characteristic) of at least some of the optical structures of the metasurface 719. The diagnostic circuit 725 may include or operate in conjunction with an integrated or external optical sensor, photodiode, or photodetector. The diagnostic circuit 725 may identify one or more optical structures of the metasurface that are defective (e.g., due to damage or manufacturing defects). The diagnostic circuit 725 may disable the defective optical structure. In embodiments in which the defective optical structure is part of a tile of optical structures, the diagnostic circuit 725 may disable each copy of the defective optical structure in each tile, which may include disabling some non-defective optical structures that are commonly controlled.

The diagnostic circuit 725 may operate to increase the effective yield rate of manufacturing tunable optical devices. Tunable optical devices that include metasurfaces with a sufficiently small number of defective optical structures (or a sufficiently small number of defective tiles of optical structures) may be determined suitable for a particular application. By disabling the defective optical structures, the tunable optical devices need not be discarded due to minor manufacturing defects.

Figure 7C:
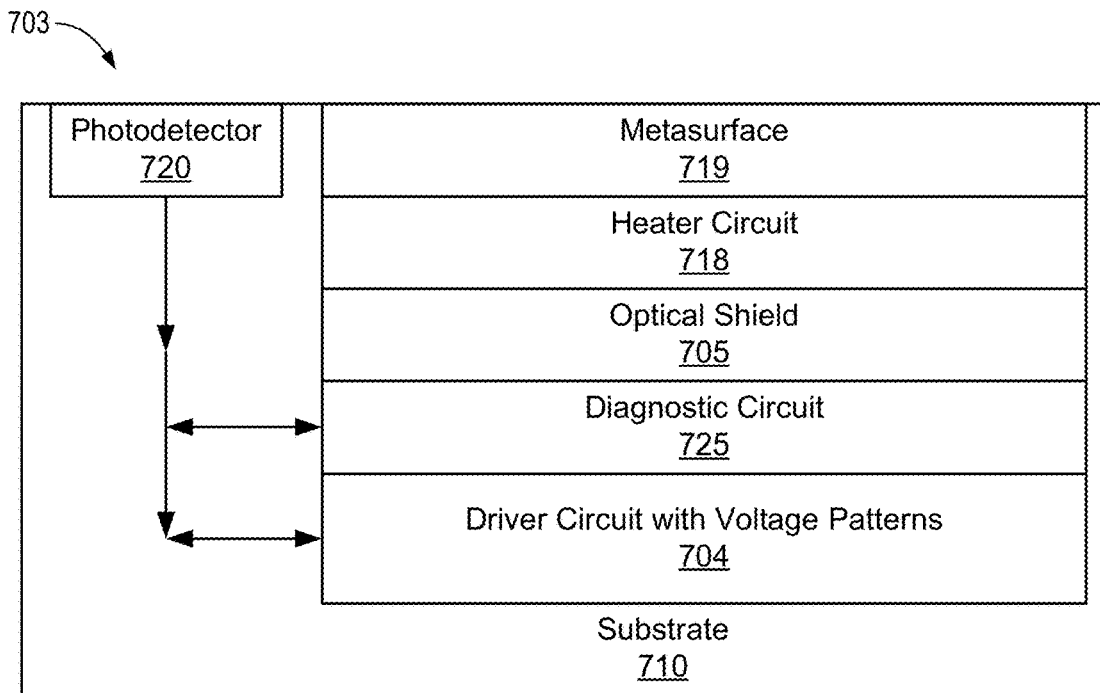
FIG. 7C illustrates a simplified block diagram of another embodiment of a tunable optical device.

FIG. 7C illustrates a simplified block diagram of another embodiment of a tunable optical device 703. Again, the substrate 710 is described in a generic sense to encompass a substrate base layer and as many other semiconductor fabrication layers as to form therein and/or thereon a driver circuit 704, a diagnostic circuit 725, an optical shield 705, a heater circuit 718, a metasurface 719, and an integrated photodetector circuit 720.

As described herein, the driver circuit 704 may be integrated within the substrate (e.g., via any of a wide variety of semiconductor manufacturing processes). The driver circuit 704 integrated within the substrate 710 selectively applies a voltage pattern to a plurality of optical structures of the metasurface 719 to control the deflection of incident optical radiation according to a target deflection pattern, as described herein.

The driver circuit 704 may include a steering pattern subcircuit that stores voltage patterns corresponding to defined deflection patterns, as described herein. In some embodiments, the voltage patterns may be encrypted. Depending on the target level of control for a particular application and the configuration of the metasurface 719 (e.g., one-dimensional rail metasurfaces or metasurfaces with two-dimensional arrays of pillars, tiled metasurfaces, etc.), the driver circuit 704 may be embodied as a one-dimensional or two-dimensional passive or active-matrix controller, as described herein. Additionally, in some embodiments, the driver circuit 704 may include control logic to control a transparent electrode (e.g., an ITO electrode) in addition to driving the optical structures of the metasurface 719.

The integrated photodetector circuit 720 may be, for example, formed as one or more transistors, photodiodes, and/or other control circuitry within the substrate 710 during the semiconductor fabrication process used to generate the other components of the tunable optical device 703. The integrated photodetector circuit 720 may be used to detect the defective operation of the tunable optical device 703 and respond by providing an alert or automatically disabling the tunable optical device 703 and/or the metasurface 719 thereof (e.g., in conjunction with the diagnostic circuit 725 described in conjunction with FIG. 7B). Additionally, or alternatively, the integrated photodetector circuit 720 may detect that the metasurface 719 is not properly steering in response to applied voltage patterns and/or exceeding threshold power levels, as described herein.

In some embodiments, the diagnostic circuit 725, the integrated photodetector circuit 720, and the driver circuit 704 may operate together to detect defects and/or ensure safe operation by disabling individual optical structures of the metasurface 719 and/or disabling the entire tunable optical device 703. While shown as individual functional blocks in FIG. 7C, it is appreciated that the integrated CMOS control circuitry and other components of the integrated photodetector circuit 720, the heater circuit 718, the diagnostic circuit 725, and the driver circuit 704 may be combined as a single integrated circuit and/or share circuit components.

As described herein, the photon shield layer or optical shield 705 may operate to prevent photons from negatively impacting the integrated circuits of the heater circuit 718, the diagnostic circuit 725, and/or the driver circuit 704. The optical shield 705 may, for example, comprise a metal layer (e.g., copper, aluminum, etc.) or a dielectric layer to block photons that are not deflected or otherwise steered by the metasurface 719.

As described herein, the tunable optical device 703 may include a heater circuit 718 in addition to or as part of a driver circuit and/or diagnostic circuit. The heater circuit 718 operates to maintain a tunable refractive index material (e.g., liquid crystal) of the metasurface 719 at or above a minimum threshold operating temperature.

Figure 8A:
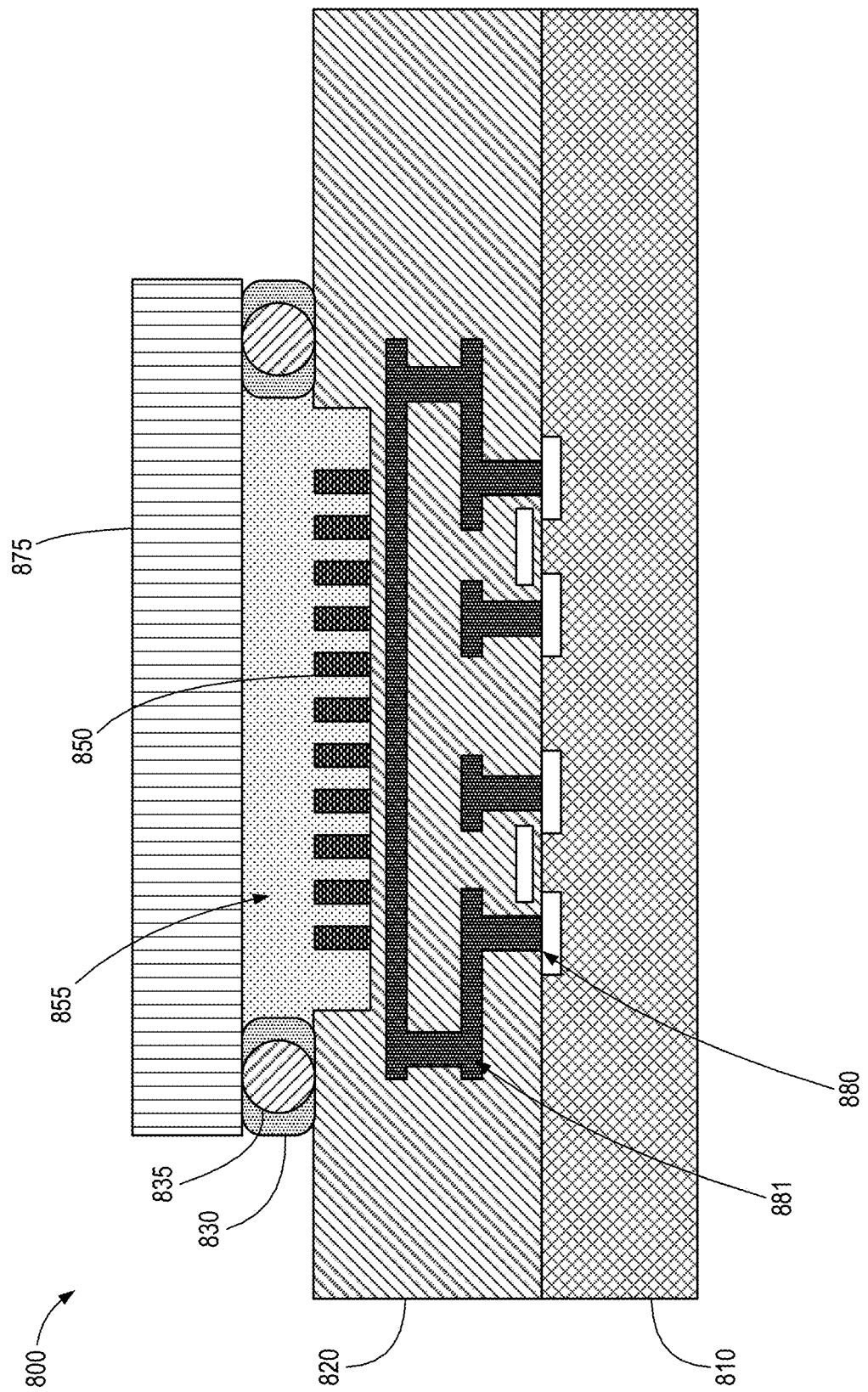
FIG. 8A illustrates a simplified diagram of a tunable optical device with a driver circuit integrated within a substrate, according to one embodiment.

FIG. 8A illustrates a simplified side-cutaway view of a tunable optical device 800 with a driver circuit 880 integrated within a substrate, according to one embodiment. As illustrated, the tunable optical device 800 includes a substrate base layer 810 upon which a dielectric layer 820 is formed. A cavity 855 is etched or otherwise formed in the dielectric layer 820. In the illustrated example, the cavity 855 is filled with liquid crystal or another liquid dielectric material with a tunable refractive index, such as an electro-optic polymer, a chalcogenide glass, and/or a semiconductor material.

Optical structures 850 are illustrated within the cavity 855 and may be embodied as, for example, elongated rails for one-dimensional beam steering or an array of pillars for two-dimensional beamforming. The optical structures 850 and the liquid crystal in the cavity 855 are elements of a metasurface positioned within the cavity 855 of the tunable optical device 800. The metasurface may further include a reflective layer beneath the optical structures 850 (not shown in the figures to avoid obscuring the drawings), such as a metal reflective layer (e.g., an aluminum or copper layer) or a Bragg reflector comprising multiple dielectric layers with varying indices of refraction. Additionally, in embodiments in which the reflective layer is conductive and the optical structures 850 are conductive (e.g., metal rails or pillars), the metasurface may further include an insulating layer between the optical structures 850 and the reflective layer(s).

A transparent cover 875 (e.g., a glass cover) spans the cavity 855 and is sealed to and supported by the rim of the dielectric layer 820 around the perimeter of the cavity 855. In the illustrated embodiment, an epoxy 830 seals the glass cover 875 to the dielectric layer 820 to form the sealed chamber that encompasses the cavity 855 and the optical structures 850. The liquid crystal is trapped or confined within the sealed chamber. A spacer bead 835 maintains a minimum gap between the glass cover 875 and the dielectric layer 820 to prevent the glass cover 875 from over compressing the epoxy 830 (e.g., making it too thin) and/or allowing the lower surface of the glass cover 875 to contact and potentially damage the optical structures 850.

The driver circuit 880 integrated within the substrate base layer 810 and/or the dielectric layer 820 may include, for example, metal-oxide-semiconductor field-effect transistors, resistors, inductors, capacitors, and other digital computing and logic components. As described herein, one or more metallization layers 881 may also be integrated within the substrate base layer 810 and/or the dielectric layer 820. The metallization layer(s) 881 may provide various interconnections between the digital computing and logic components (e.g., transistors, resistors, etc.) and connections to the optical structures above the integrated circuit.

In all the figures, the diagrams are merely for illustrative purposes and are not to scale and are not intended to represent the actual sizes of any of the elements, the relative sizes of various elements, the actual shapes of the elements, or even the quantity of any given element. For example, the dielectric layer 820 of the substrate and the substrate base layer 810 may each comprise multiple layers of dielectric materials. As another example, while only eleven optical structures 850 are shown across the width of the cavity 855, the cavity 855 may be on the order of tens of millimeters while the optical structures 850 may have widths on the order of tens of nanometers. Thus, the actual number of optical structures 850 may be in the thousands, tens of thousands, hundreds of thousands, or millions. Similarly, while the width of the tunable optical device 800 may be on the order of tens of millimeters, the total thickness of the tunable optical device 800 may only be a few millimeters or less. As a final example to illustrate the limitations of the figures, the glass cover 875 might be millimeters thick (e.g., 0.5 to 3 millimeters thick), while the spacer bead 835 within the epoxy 830 might only be 1 to 10 microns thick. Thus, it will be appreciated by one of skill in the art that the relative sizes, dimensions, shapes, element counts, etc. are exaggerated and distorted to facilitate an understanding and visualization of various elements.

The driver circuit 880 may be integrated (e.g., as an integrated CMOS circuit) within the substrate (e.g., within the substrate base layer 810 and the dielectric layer 820). The driver circuit 880 may be embodied according to any of the various embodiments described herein.

Figure 8B:
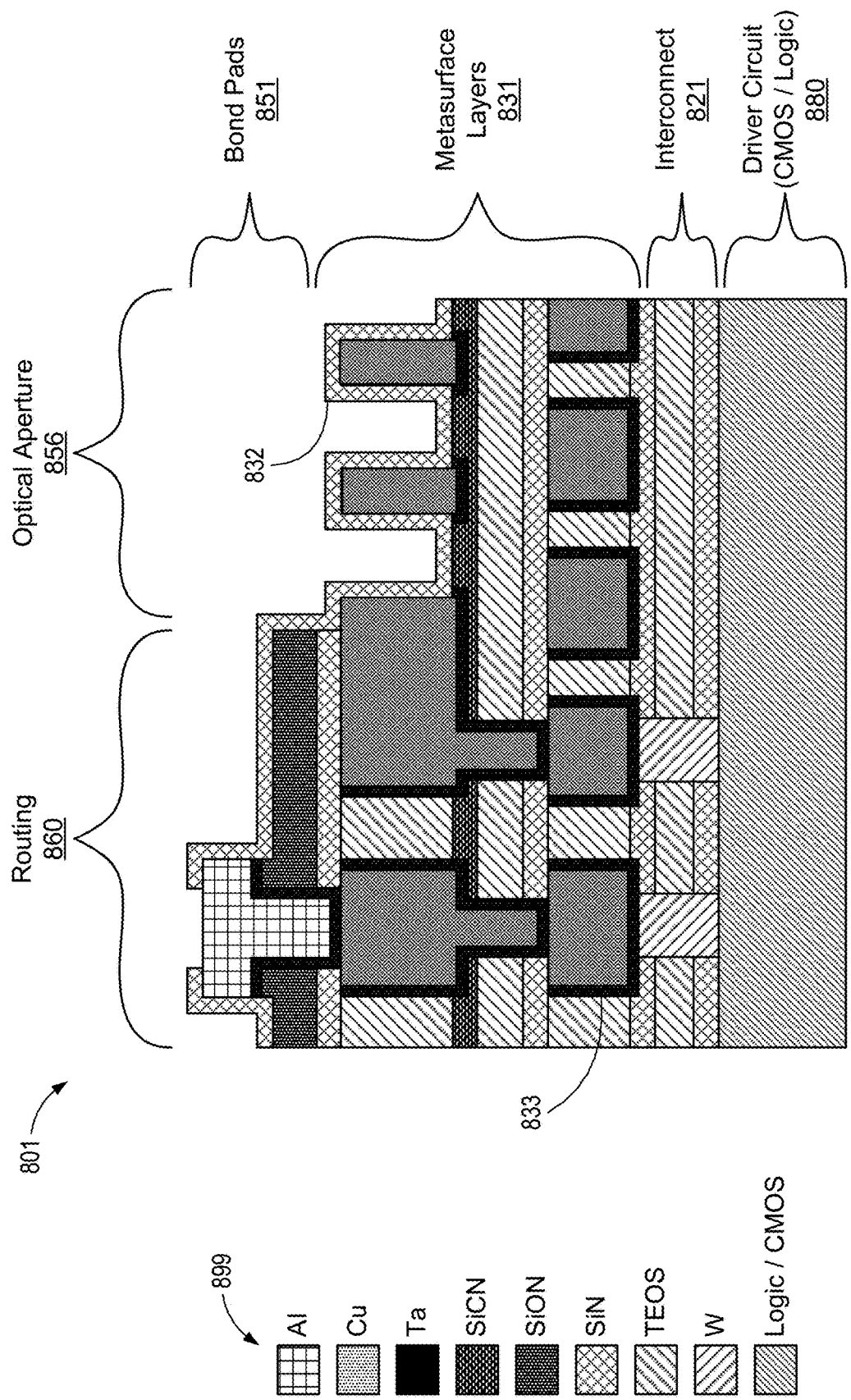
FIG. 8B illustrates a cross-section of a portion of a tunable optical device with a driver circuit integrated via a complementary metal-oxide-semiconductor (CMOS) process, according to one embodiment.

FIG. 8B illustrates a cross-section of a portion of a tunable optical device 801 with a driver circuit 880 integrated via the CMOS fabrication process, according to one embodiment. As illustrated, the integrated driver circuit 880 may be connected via one or more conductors within a routing region 860 to external bond pads 851 on an upper surface of the tunable optical device 801. In some embodiments, the CMOS-integrated driver circuit may be connected to the bond pads 851 and control inputs of the metasurface layers 831 via deposited conductors extending through the various dielectric layers.

The illustrated cross-sectional view of the tunable optical device 801 includes one or more interconnect layers 821 (e.g., including metallization layers 881, such as those described in conjunction with FIG. 8A) and various metasurface layers 831, including optical structures 832 within an optical aperture 856 of the tunable optical device 801. The diagram includes a legend 899 of example materials that can be used for each of the illustrated layers. It is appreciated that functionally equivalent and functionally similar materials may be substituted in many instances. For example, the illustrated embodiment is silicon-based and utilizes various copper and aluminum elements; however, it is appreciated that alternative metals and dielectrics may be utilized in an alternative semiconductor manufacturing process (e.g., a gallium nitride (GaN) semiconductor manufacturing process).

Figure 8C:
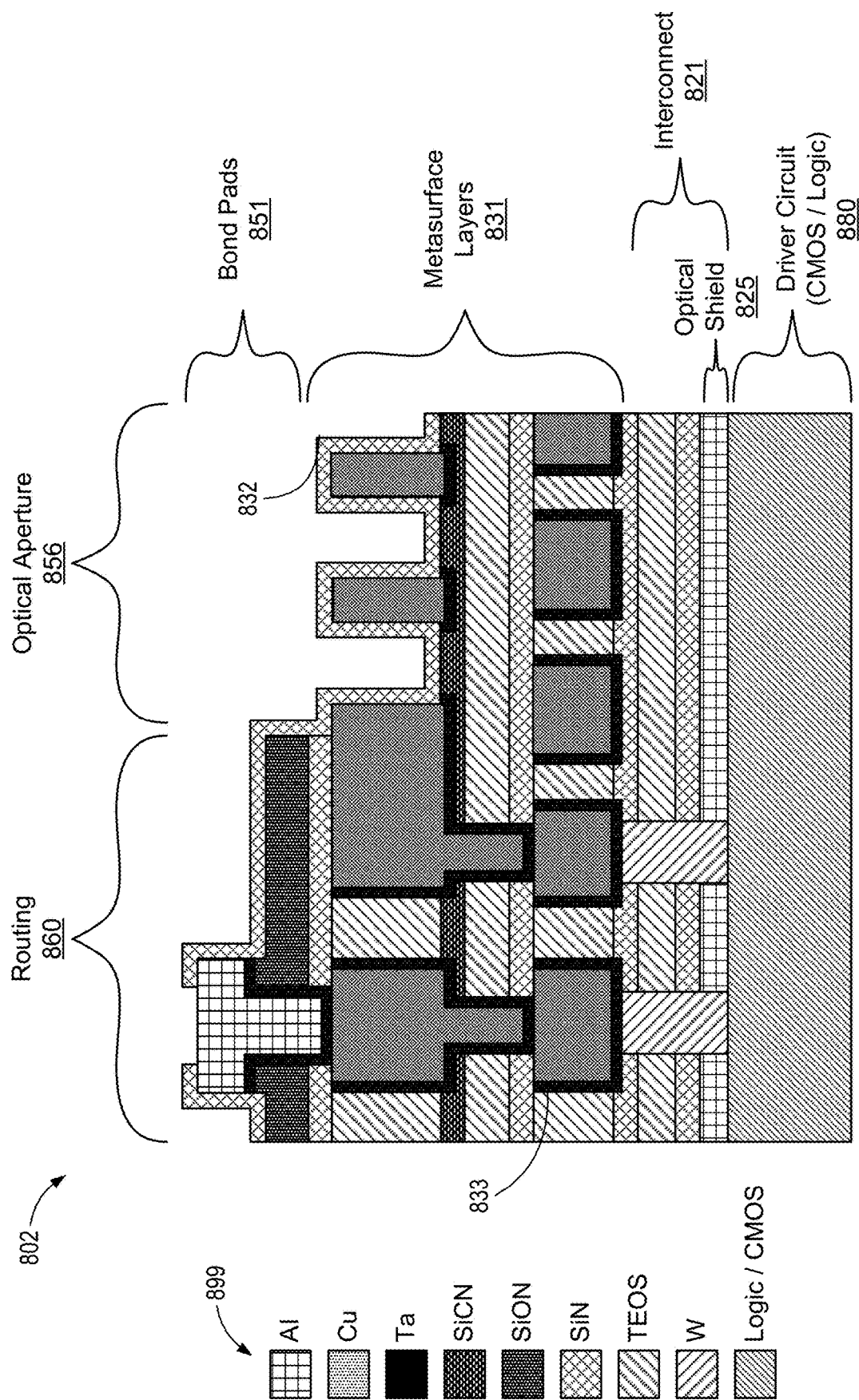
FIG. 8C illustrates another cross-section of a portion of a tunable optical device with an integrated driver circuit and a photon shield layer, according to another embodiment.

FIG. 8C illustrates another cross-section of a portion of a tunable optical device 802 with an integrated driver circuit 880, interconnect layers 820, metasurface layer 831, and bond pads 851, as described in conjunction with FIG. 8B. Additionally, the tunable optical device 802 differs from the embodiment in FIG. 8B in that it further includes a photon shield layer or optical shield 825. The optical shield 825 may be specifically deposited between the tunable optical metasurface (metasurface layers 831) and the CMOS logic driver circuit 880.

The optical shield 825 is illustrated as an aluminum layer, per the legend 899. However, the optical shield 825 may comprise any of a wide variety of metal layers (e.g., copper, aluminum, silver, gold, tungsten, etc.) or a dielectric layer to block photons not deflected by the metasurface from contacting and potentially disrupting the operation of the driver circuit and/or diagnostic circuit in some embodiments. In embodiments in which the optical shield 825 comprises a dielectric layer, the optical shield 825 may comprise graphite, carbon, or other light-absorbing or light-reflecting materials. In other embodiments, the optical shield 825 may be embodied as a Bragg reflector.

Notably, in FIGS. 8B and 8C, the cross-backplane reflectors 833 are illustrated in a cross-sectional view extending into and out of the page. The optical structures 832 may be embodied as a two-dimensional array of optical pillars or as a one-dimensional array of elongated rails (e.g., elongated metal rails). In embodiments in which the optical structures 832 are embodied as elongated rails, the cross-backplane reflectors 833 extend perpendicular to the direction in which the elongated rails 832 extend.

Figure 8D:
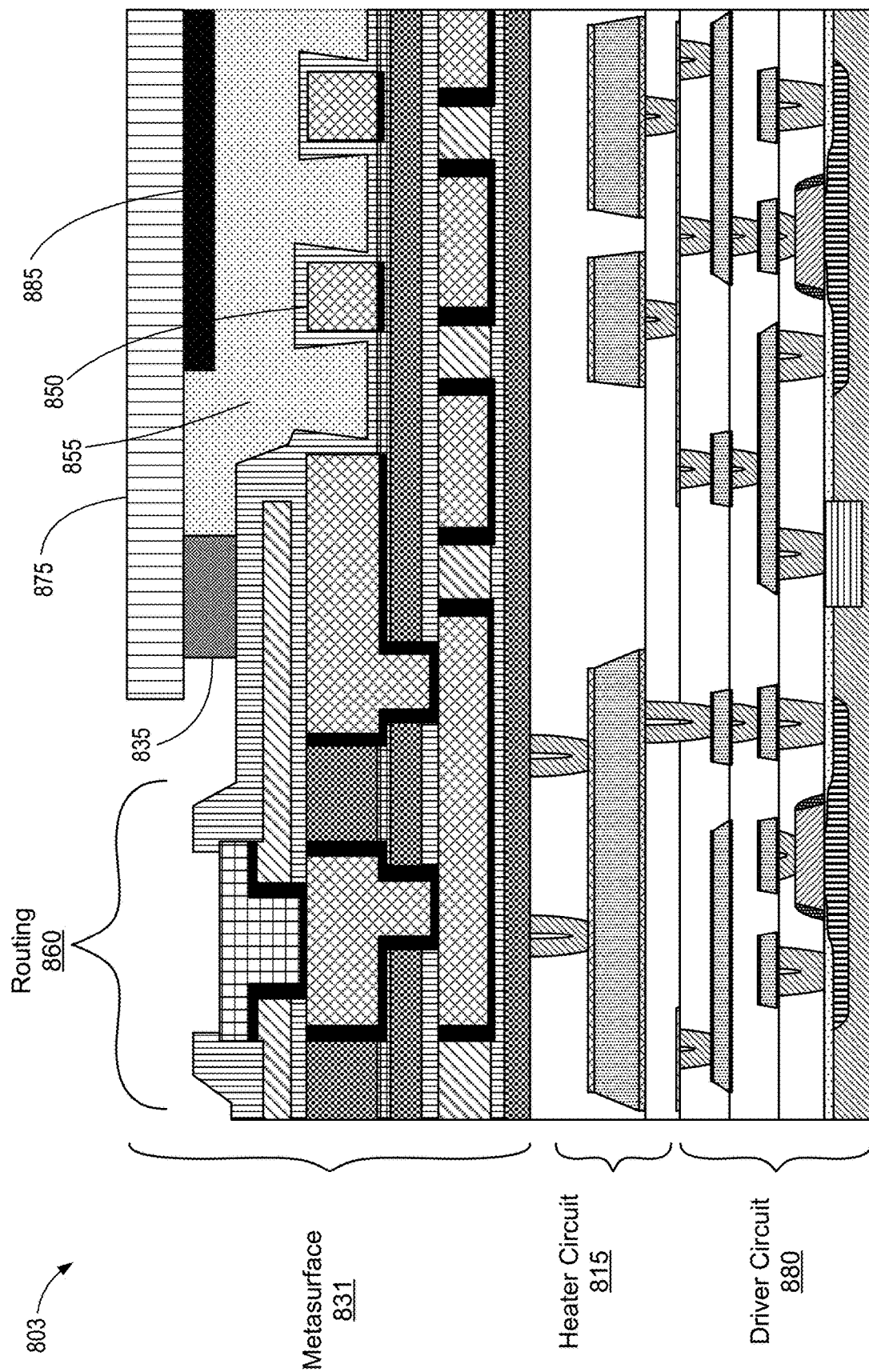
FIG. 8D illustrates another cross-section of a portion of a tunable optical device with an integrated driver circuit and heater circuit, according to another embodiment.

FIG. 8D illustrates another cross-section of a portion of a tunable optical device 803 with an integrated driver circuit 880 and heater circuit 815, according to another embodiment. As illustrated, in the zoomed in-view, the driver circuit 880 may be implemented as an application-specific integrated CMOS circuit of transistors. The heater circuit 815 may be integrated with the substrate in addition to or as part of a driver circuit and/or diagnostic circuit, as described herein. The heater circuit 815 operates to maintain the tunable refractive index material (e.g., liquid crystal) within the cavity 855 of the metasurface 831 above a minimum threshold operating temperature. For example, the heater circuit 815 may be implemented as part of a CMOS fabrication process with an automatic temperature-controlled feedback loop that includes a heating resistor.

One or more heat distribution plates may be deposited during the CMOS fabrication process to distribute the heat more evenly and/or more quickly to the liquid crystal (or other tunable refractive index materials) within the cavity 855 around the optical structures 850 of the metasurface 831. According to various embodiments, the driver circuit 880 may also include integrated control logic to control the voltage of a transparent electrode 885 deposited on the glass cover 875 of the metasurface 831.

FIGS. 9A-9G illustrate examples of beamforming, beam steering, collimating, focusing, divergent beams, and the like. However, the illustrated embodiments are merely examples of possible deflection patterns. According to various embodiments, tunable optical devices described herein can include two-dimensionally steerable or one-dimensionally steerable tunable metasurfaces. A driver circuit integrated within the substrate (e.g., base substrate layer and/or deposited dielectric layers) can be used to implement individual phase and amplitude control of deflected optical radiation. In various embodiments, the driver circuit can implement arbitrary phase and amplitude control of individual optical structures of the tunable metasurface or tiled groupings of optical structures of the tunable metasurface.

In many instances, an external driver is impractical due to the extremely high voltage interconnect density that would be required in an off-chip driver. Accordingly, many implementations and control patterns contemplated by this disclosure require the use of an integrated driver, as described herein in various embodiments, since each optical structure across the metasurface must be tuned to a unique phase or amplitude level to perform functions such as collimation and beam steering simultaneously. The number of unique voltage inputs to the optical device required to implement an equivalent level of optical functionality and control makes an external driver impractical.

Figure 9A:
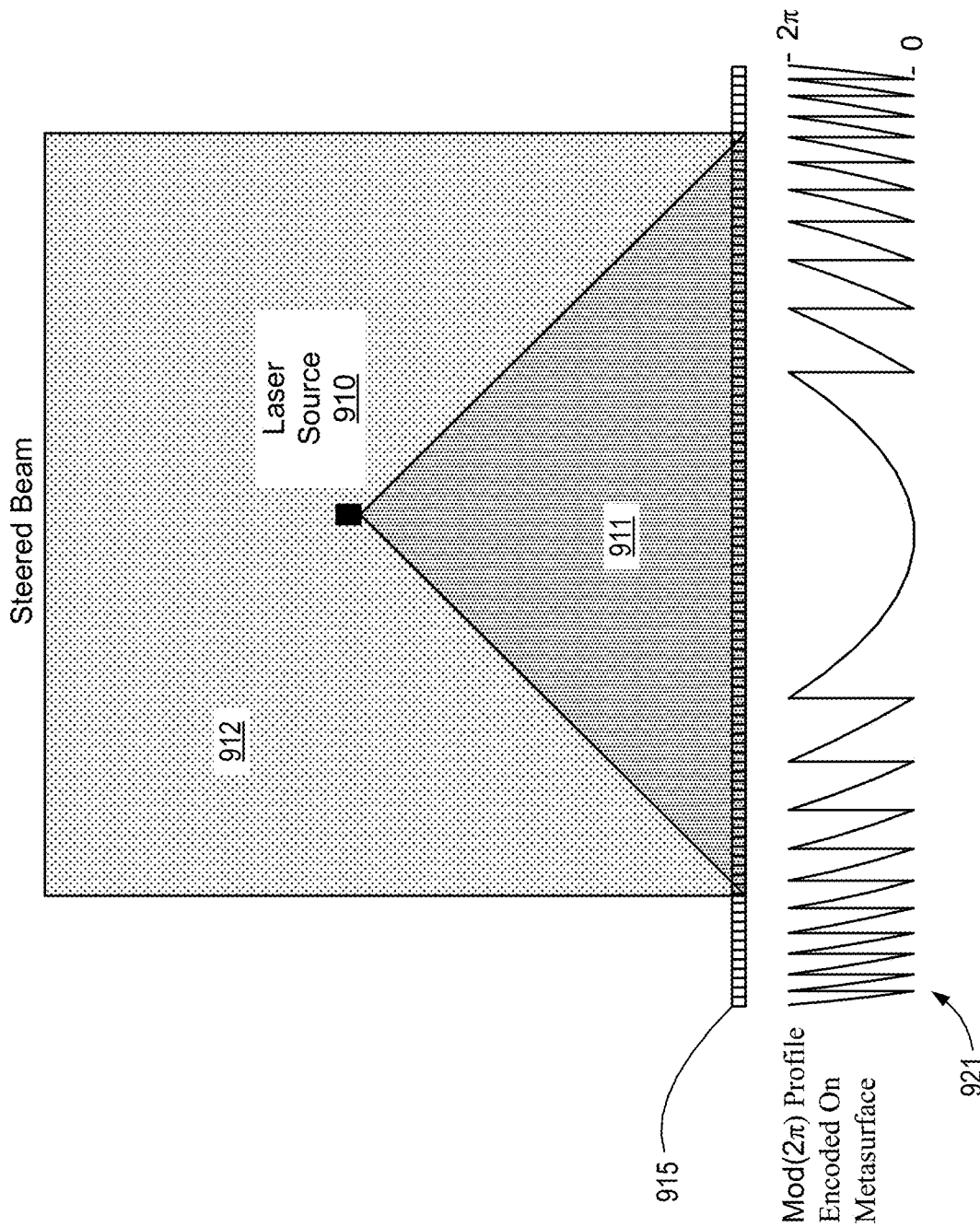
FIG. 9A illustrates a tunable optical device with an integrated driver operating to simultaneously collimate and steer a beam according to a target deflection pattern, according to one embodiment.

FIG. 9A illustrates the tunable optical device 915 with the integrated driver circuit operating to collimate and/or steer (e.g., simultaneously collimate and steer) a beam according to a target deflection pattern via the tunable optical metasurface, according to one embodiment. In the illustrated embodiment, the laser source 910 is positioned centered and above within the optical aperture of the tunable optical device 915. Incident diverging optical radiation 911 is reflected according to a target radiation pattern as a steered, collimated beam of optical radiation, at 912. The integrated driver circuit of the tunable optical device may apply a voltage pattern to the optical structures of the metasurface corresponding to the illustrated Mod($2\pi$) profile 921. The phase pattern applied may be a parabolic profile Mod($2\pi$), as shown.

Figure 9B:
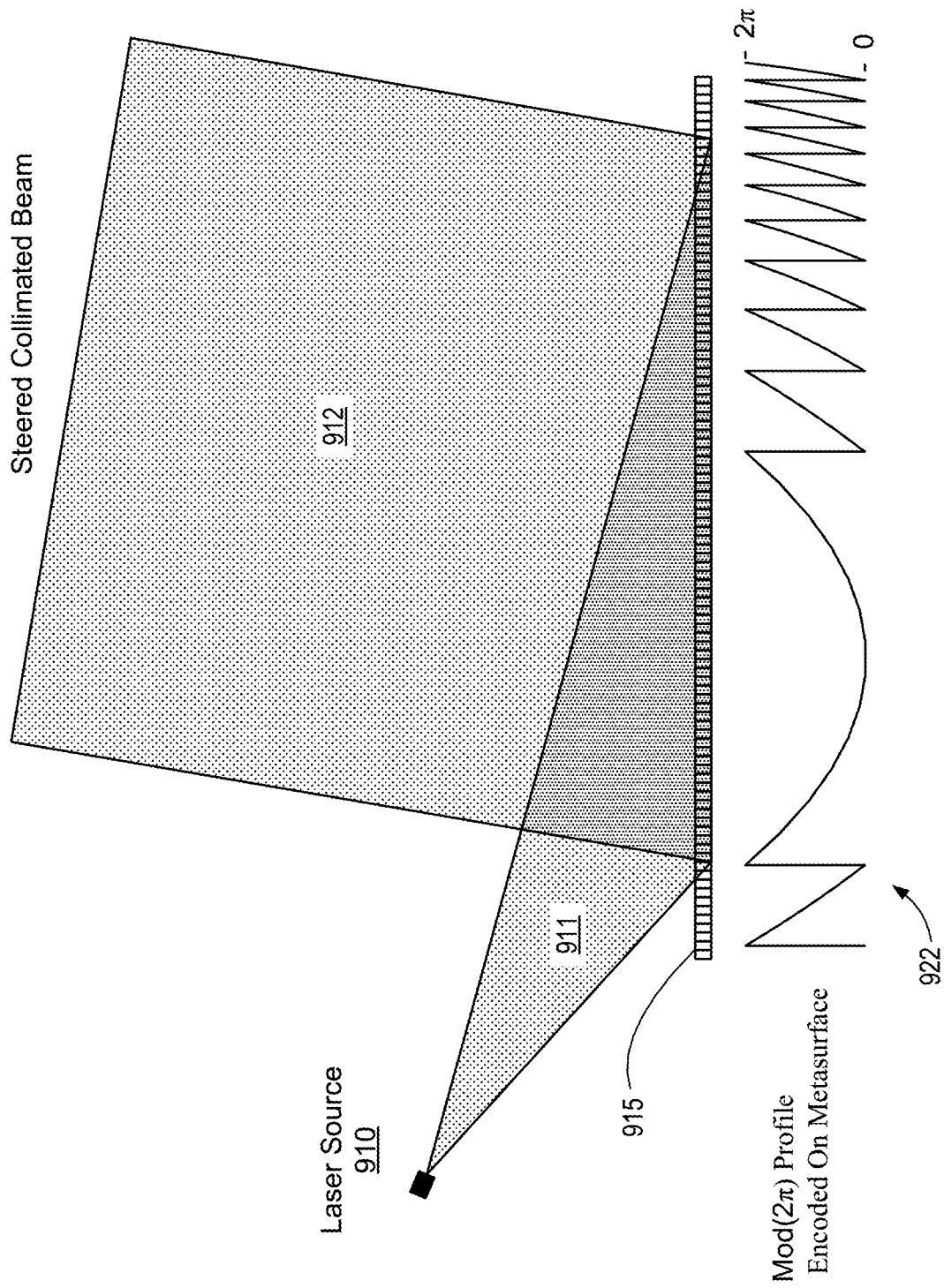
FIG. 9B illustrates a tunable optical device with an integrated driver operating to simultaneously collimate and steer a beam according to a target beam deflection pattern, according to one embodiment.

FIG. 9B illustrates the tunable optical device 915 with the integrated driver circuit operating to steer a beam according to a collimated beam deflection pattern, at 912, via a tunable optical metasurface, according to one embodiment. Again, the laser source 910 generates diverging optical radiation that is incident, at 911, on the metasurface and steerably reflected as a collimated beam, at 912. The integrated driver circuit of the tunable optical device may apply a voltage pattern to the optical structures of the metasurface corresponding to the illustrated Mod($2\pi$) profile 922. The phase pattern applied may be an offset parabolic profile Mod($2\pi$), as shown. As illustrated, the tunable optical device 915 can be driven to simultaneously steer and collimate incident optical radiation.

Figure 9C:
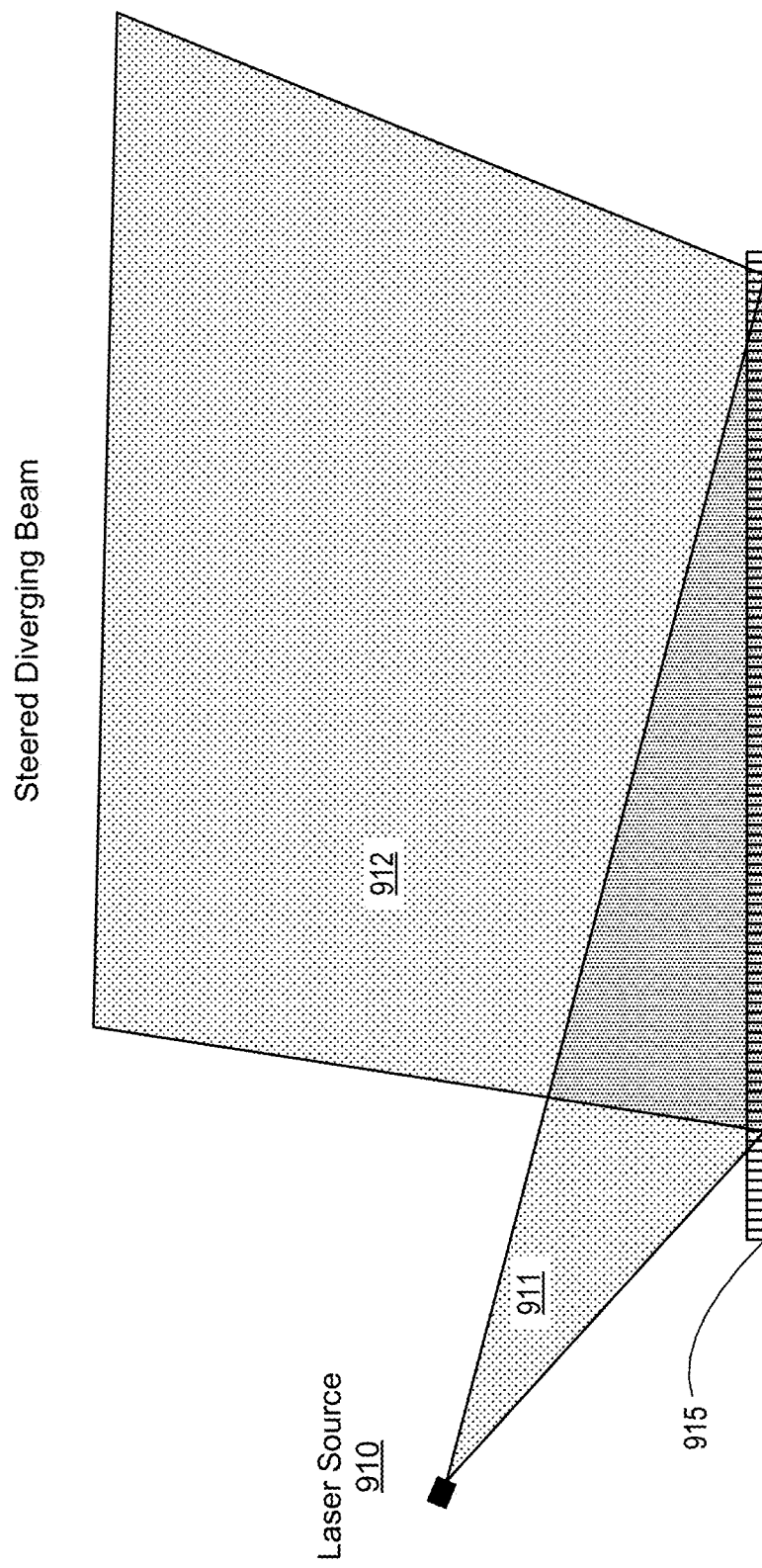
FIG. 9C illustrates a tunable optical device with an integrated driver operating to steer a beam according to a diverging beam deflection pattern, according to one embodiment.

FIG. 9C illustrates the tunable optical device 915 with the integrated driver circuit operating to steer a beam according to a diverging beam deflection pattern, at 912, according to one embodiment.

Figure 9D:
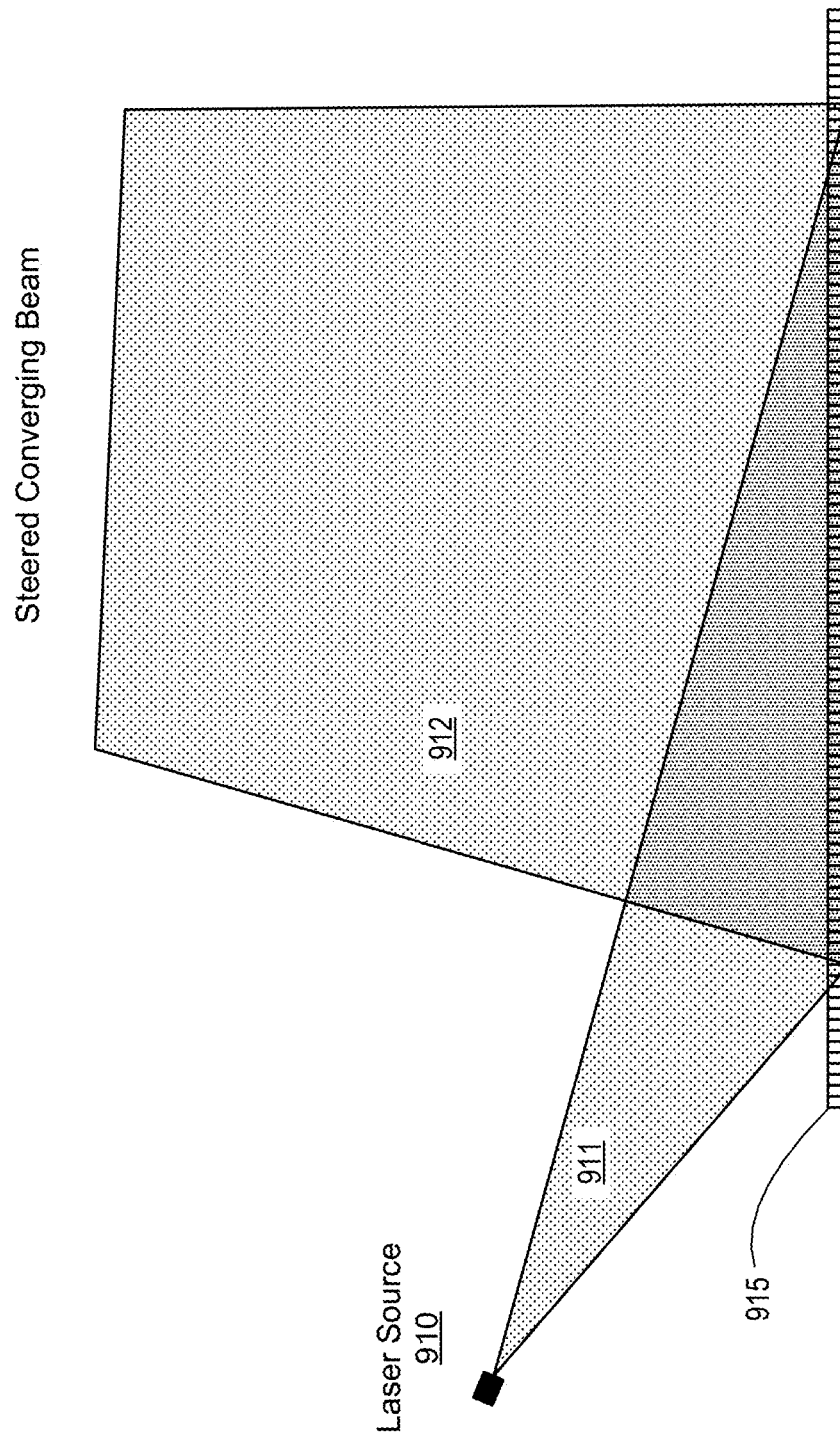
FIG. 9D illustrates a tunable optical device with an integrated driver operating to steer a beam according to a converging beam deflection pattern, according to one embodiment.

FIG. 9D illustrates the tunable optical device 915 with the integrated driver circuit operating to steer a beam according to a converging beam deflection pattern, according to one embodiment.

Figure 9E:
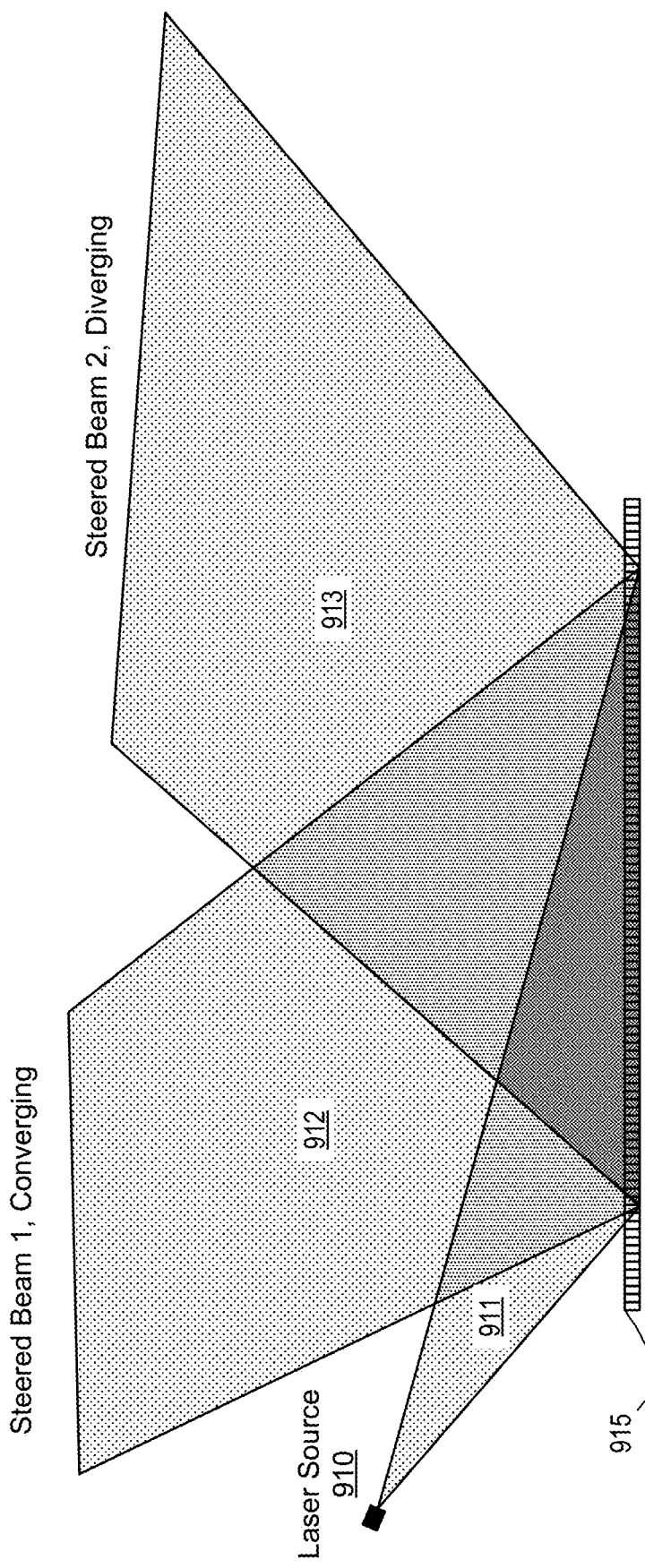
FIG. 9E illustrates a tunable optical device with an integrated driver operating to steer a beam according to two distinct beam patterns, according to one embodiment.

FIG. 9E illustrates the tunable optical device 915 with the integrated driver circuit operating to steer a beam according to two distinct beam patterns, at 912 and 913, according to one embodiment. Specifically, the integrated driver circuit steers a first, converging beam 912 in a first direction and a second, diverging beam 913 in a second direction. According to various embodiments, the integrated driver circuit may steer the first and second beams 912 and 913 at the same time in two different directions or according to a time-multiplexed operation paradigm. In embodiments in which the two beams are generated simultaneously, the phase pattern applied to the metasurface may be a superposition of two parabolic lens functions. Other phase patterns may be generated via iterative phase estimation algorithms such as the Gerchberg-Saxton algorithm.

According to various embodiments, the tunable optical device 915 may be configured and/or controlled via the integrated driver to generate two distinct beam patterns 912 and 913 that are each uniquely and independently steered at different angles and shaped to be diverging, collimating, or converging. Simultaneously or time-multiplexed, each of the two distinct and independent beam patterns 912 and 913 may have equal intensities or different intensities while still using the entire aperture of the tunable optical device 915.

Figure 9F:
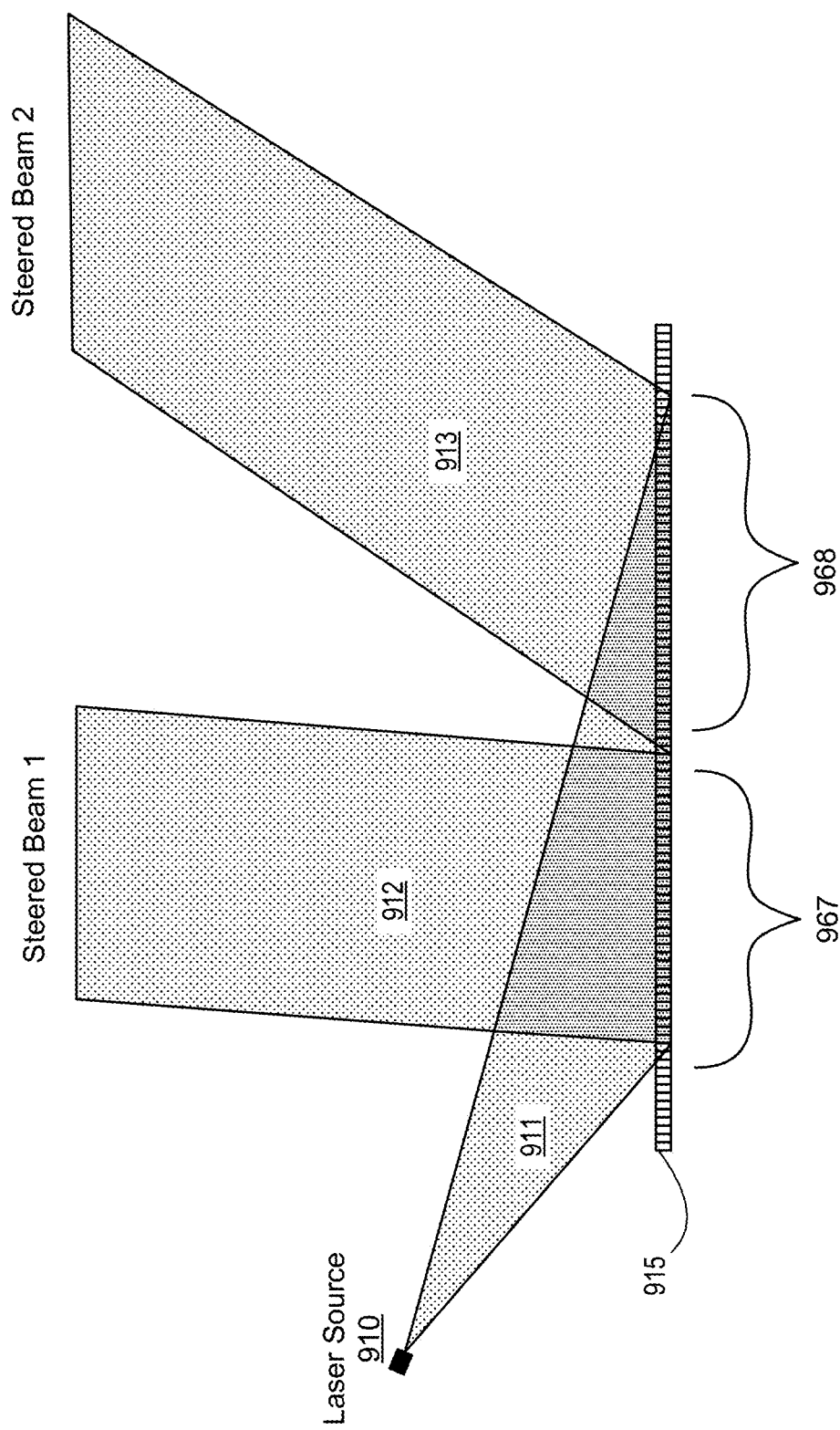
FIG. 9F illustrates a tunable optical device with an integrated driver operating to steer a beam in two different directions by splitting the aperture, according to one embodiment.

FIG. 9F illustrates the tunable optical device 915 with the integrated driver circuit operating to steer a beam in two different directions by splitting the aperture, at 912 and 913, according to another embodiment, using two different parts of the aperture. A first portion 967 of the aperture is used to generate the first beam 912. The second portion 968 of the aperture is used to generate the second beam 913.

Figure 9G:
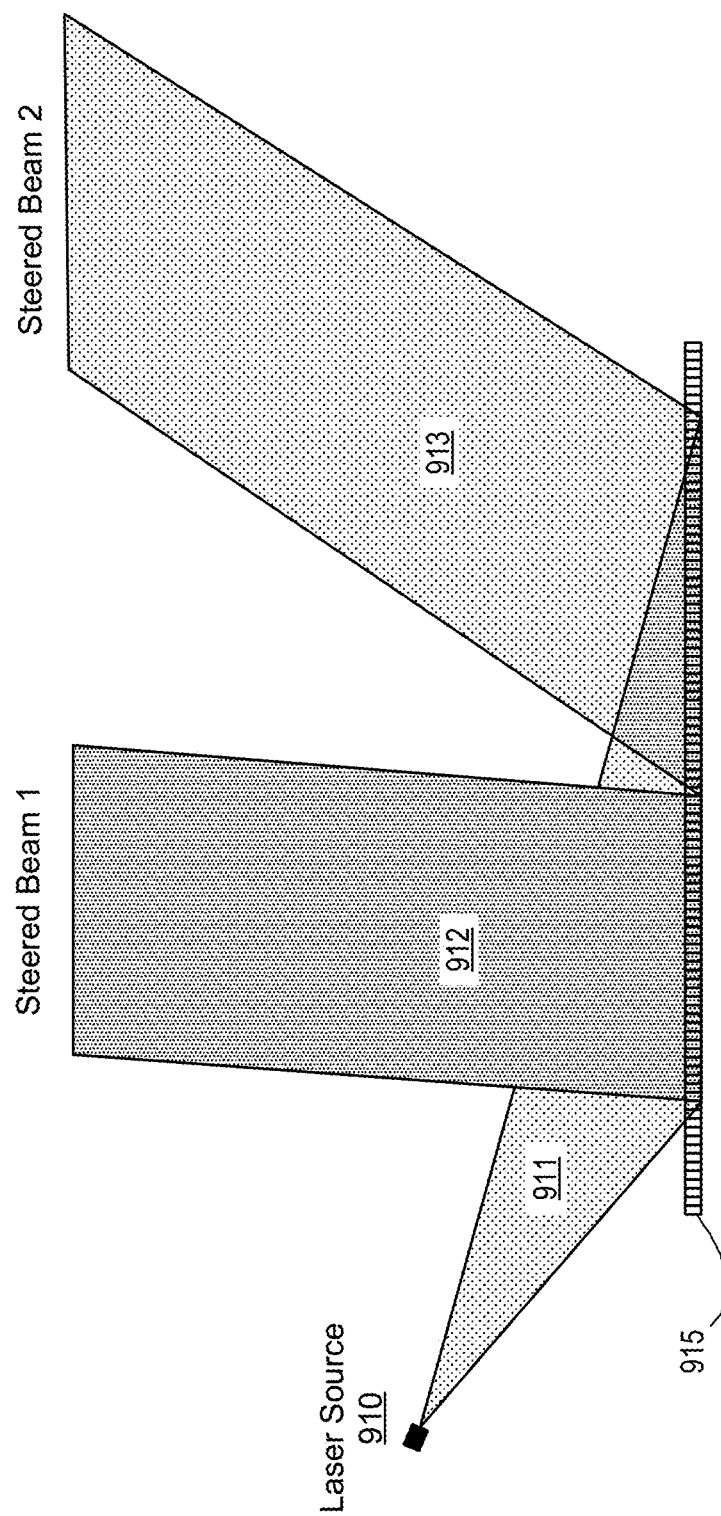
FIG. 9G illustrates a tunable optical device with an integrated driver operating to steer a beam in two different directions with varying intensities, according to one embodiment.

FIG. 9G illustrates the tunable optical device with the integrated driver circuit operating to steer a beam in two different directions with varying intensities, at 912 and 913, according to one embodiment. As illustrated, the integrated driver circuit may steer a first beam 912 with a first intensity (shown in darker shading) that is greater than a second intensity (shown in lighter shading) of the second beam 913. In some embodiments, the driver circuit may steer a first beam 912 with a significant portion (e.g., most) of the power in a target direction according to a target deflection pattern.

The second beam 913 may be directed to an integrated photodetector (or external photodetector) that can be used to confirm the intended operation of the tunable optical device. For example, the first and second beams 912 and 913 may correspond to one another according to a known relationship, such that a steering angle, intensity, and/or beam shape of the second, lower intensity beam 913 can be used to confirm the operation and transmission of the first beam 912.

Figure 10:
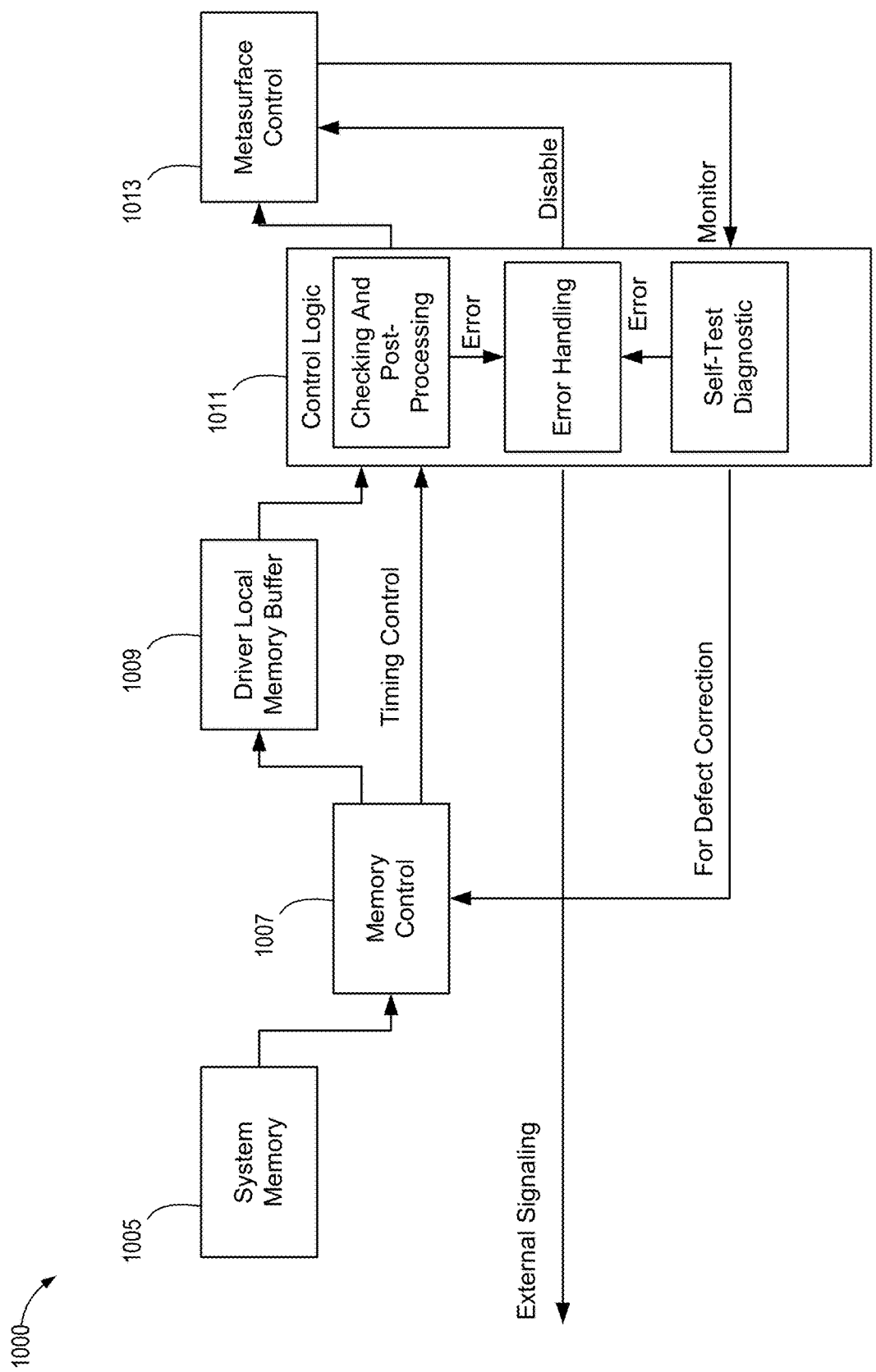
FIG. 10 illustrates a simplified block diagram of some of the functionalities of one example of an integrated circuit within the substrate of a tunable optical device, according to one embodiment.

FIG. 10 illustrates a simplified block diagram 1000 of some of the functionalities of one example of an integrated circuit within the substrate of a tunable optical device, according to one embodiment. As illustrated, control logic 1011 includes subsystems for checking and post-processing (e.g., by decryption, cryptographic authentication, decompression, error-detection/-correction, etc.) voltage pattern data prior to sending it to the metasurface control subsystem 1013. Control logic 1011 also includes error handling in the event that the patterns are deemed invalid. The control logic 1011 may also implement self-test diagnostics to monitor metasurface health.

The control logic applies patterns of voltage differentials to optical structures of a metasurface (or tiles of optical structures of a metasurface) via a metasurface control subsystem 1013. According to various embodiments, a memory control subsystem 1007 controls the delivery of data from the system memory 1005 to the control logic 1011 via the driver local memory buffer 1009. The local memory buffer 1009 may be omitted in some embodiments. As described herein, the system memory 1005 may store information defining acceptable voltage patterns that can be applied by the control logic 1011 and the metasurface control subsystem 1013 to the optical structures of the metasurface.

According to various embodiments, the voltage patterns may be encrypted or cryptographically signed so as to prevent intentional or accidental modification that might result in voltage patterns being applied that are not authorized or approved. A user or outside controller may specify target deflection patterns to be attained by the metasurface. The specified target deflection pattern may be matched (e.g., via a lookup table or the like) with an encrypted or cryptographically signed voltage pattern that can be applied to the metasurface to attain the target deflection pattern.

Figure 11A:
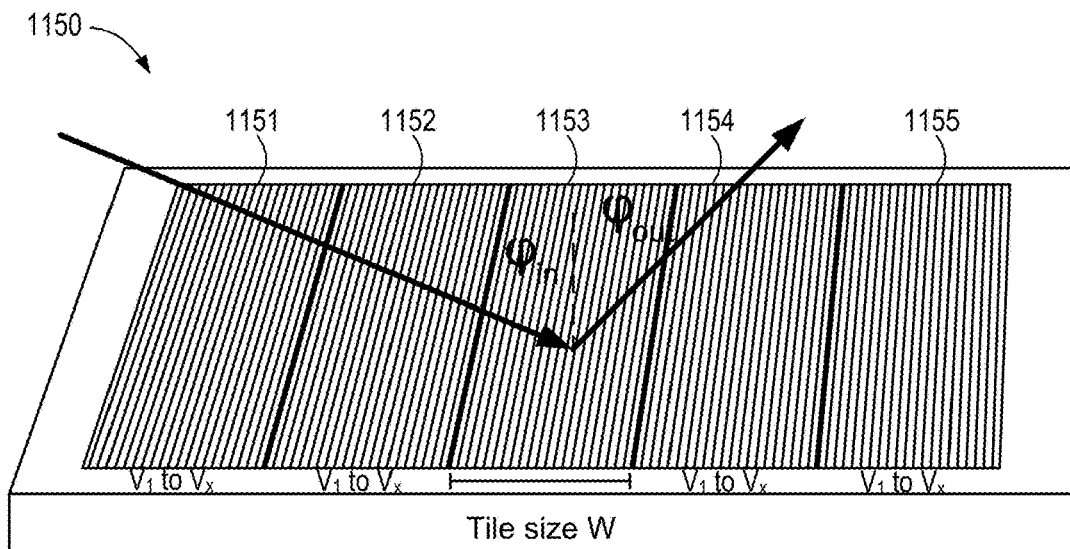
FIG. 11A illustrates an example diagram of a tiled LCM where each tile includes a plurality of rails, according to one embodiment.

FIG. 11A illustrates an example diagram of a tiled LCM 1150 where each tile includes a plurality of rails, according to one embodiment. The simplified diagram includes three subsets of reflector rails or "tiles" 1151, 1152, 1153, 1154, and 1155. Any number of tiles (tens, hundreds, thousands, etc.) may be used to form an LCM, and each tile may include any number of reflector rails therein. The same voltage pattern $V_1$ to $V_x$ may be applied to the resonator rails of each tile 1151-1155 during operation to attain a target reflection pattern.

Figure 11B:
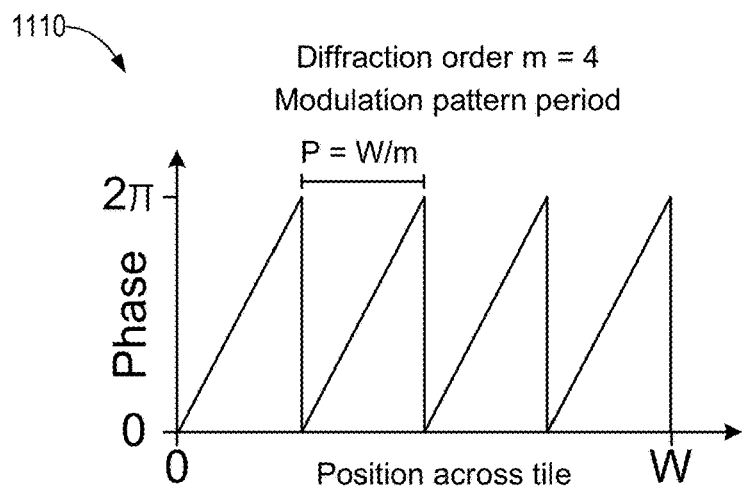
FIG. 11B illustrates a graph of a phase response with respect to position on a tile of a plurality of rails of an LCM with a diffraction order of 4, according to one embodiment.

FIG. 11B illustrates a graph 1110 of a phase response with respect to position on a tile of a plurality of rails of an LCM with a diffraction order of 4, according to one embodiment. As illustrated, the phase response at each location along the tile varies between 0 and $2\pi$ over a distance corresponding to the selected diffraction order.

Figure 11C:
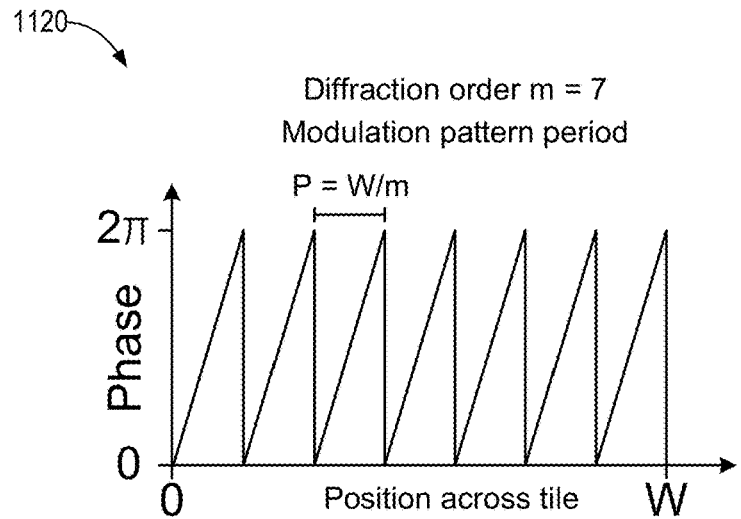
FIG. 11C illustrates a graph of another phase response with respect to position on a tile of a plurality of rails of an LCM with a diffraction order of 7, according to one embodiment.

FIG. 11C illustrates a graph 1120 of another phase response with respect to position on a tile of a plurality of rails of an LCM with a diffraction order of 7, according to one embodiment. The higher diffraction order results in larger changes in phase over shorter distances as compared to the LCM with a diffraction order of 4.

Figure 12:
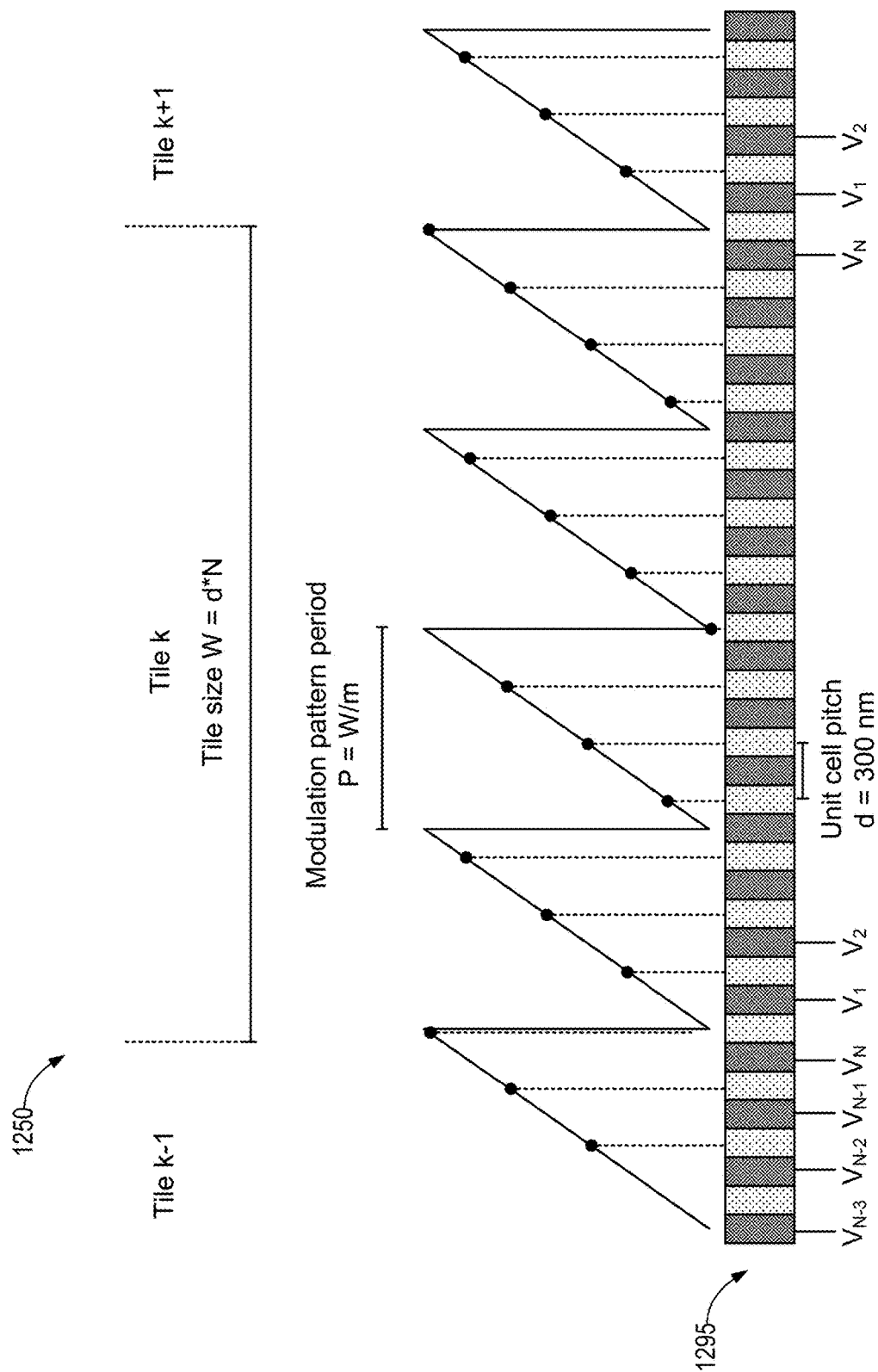
FIG. 12 illustrates an example diagram of a plurality of rails forming a single tile of a multi-tile LCM, according to one embodiment.

FIG. 12 illustrates an example diagram of a plurality of resonator rails 1295 forming a single tile 1250 of a multi-tile LCM, according to one embodiment. As illustrated, voltages $V_1, V_2, \ldots V_N$ may be applied to the resonator rails 1295 to generate a modulation pattern period, P, that is a function of the tile size divided by the diffraction order. The tile size, W, is a function of the on-center spacing or distance, d, between the resonator rails (illustrated as an example 300 nanometers) multiplied by the total number of rails in each tile (e.g., 10, 100, 10,000, 100,000, or more).

Figure 13:
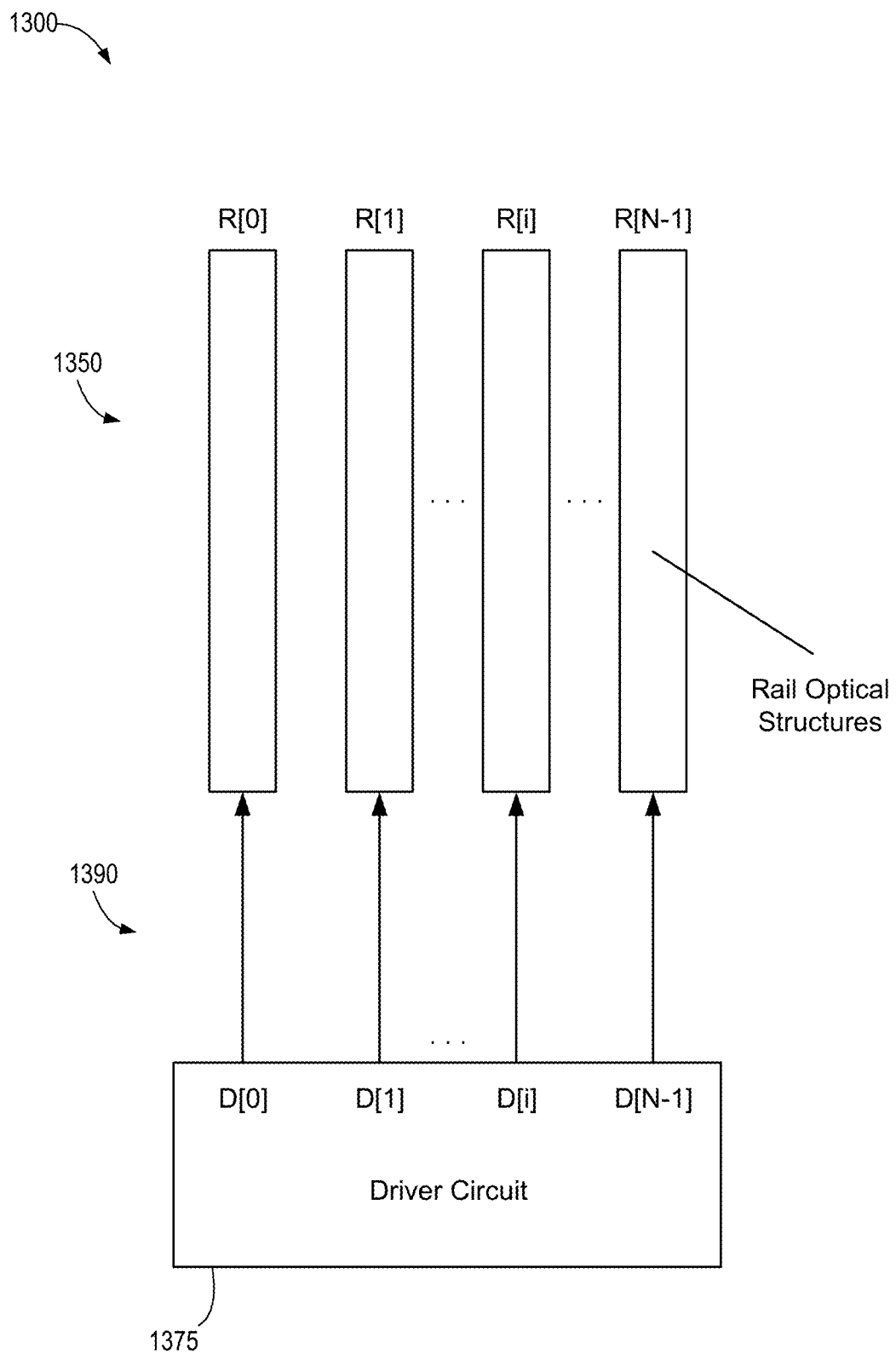
FIG. 13 illustrates an example of an integrated driver circuit with a one-dimensional passive matrix of driver channels to drive each individual rail of a metasurface, according to one embodiment.

FIG. 13 illustrates an example of an integrated driver circuit 1375 with a one-dimensional passive matrix of driver channels 1390 to drive each individual rail 1350 of a metasurface of a tunable optical device 1300, according to one embodiment. The illustrated driver circuit 1375 operates as a one-dimensional passive matrix controller with an individual driver channel 1390 for each rail 1350 in the metasurface of the tunable optical device 1300. This may also be conceptually the same as a single tile metasurface in which all the rails of the metasurface are part of the same tile. As illustrated, N control outputs and associated driver channels 1390 are used to drive N rails 1350 of the metasurface the tunable optical device 1300, where N is an integer value.

Figure 14:
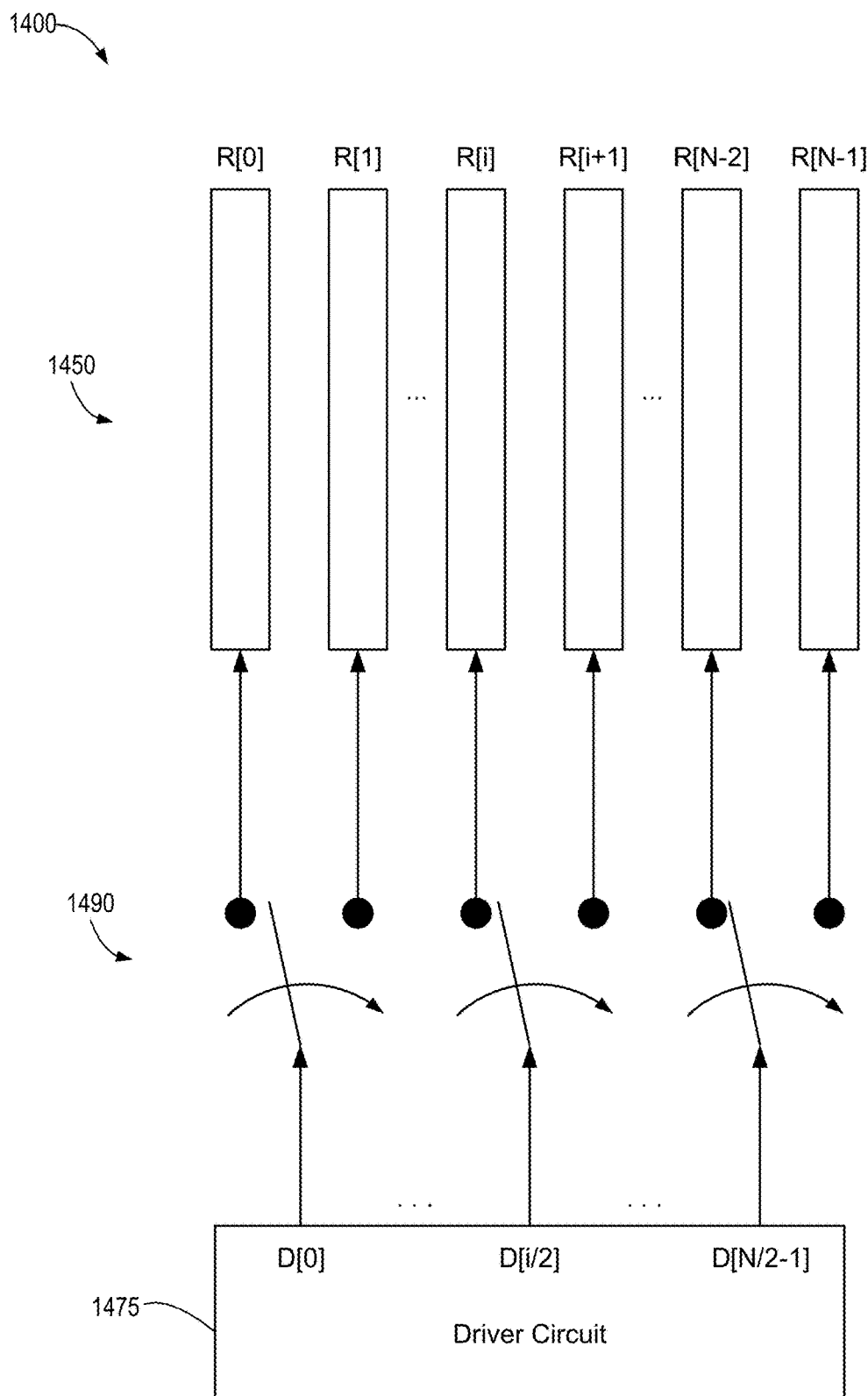
FIG. 14 illustrates another example of an active-switch matrix integrated driver circuit to drive the individual rails in a tile of a metasurface, according to one embodiment.

FIG. 14 illustrates another example of an active switch-matrix integrated driver circuit 1475 to drive the individual rails 1450 in a tile of a metasurface of a tunable optical device 1400, according to one embodiment. The illustrated driver circuit 1475 operates as a one-dimensional active switch-matrix controller with N/2 control outputs and associated driver channels 1490 used to drive N rails 1450 of the metasurface of the tunable optical device 1400, where N is an integer value.

Figure 15:
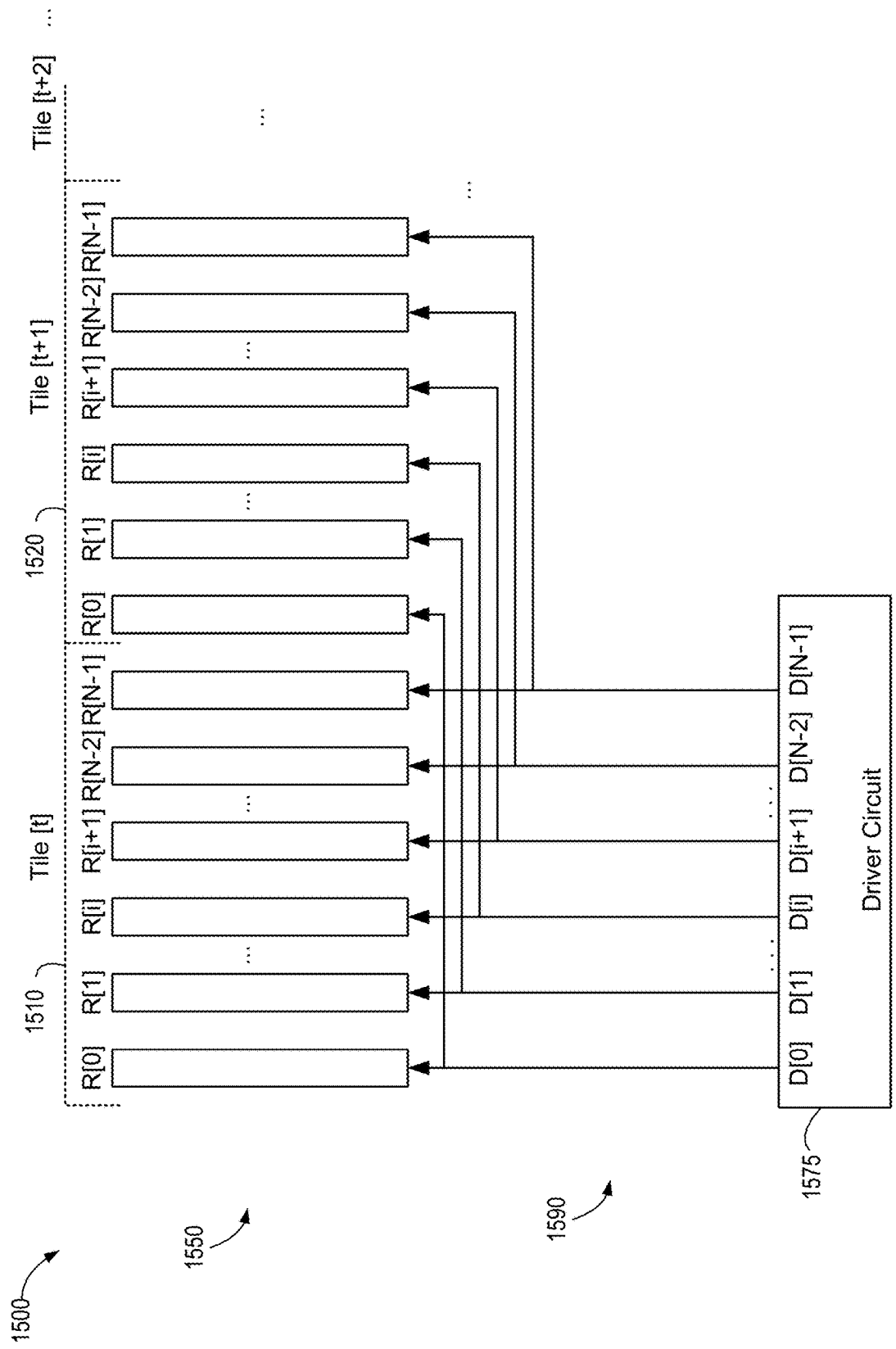
FIG. 15 illustrates an example of a driver circuit with a one-dimensional passive matrix of driver channels to drive each individual rail of each tile in a tiled metasurface, according to one embodiment.

FIG. 15 illustrates an example of a driver circuit 1575 with a one-dimensional passive matrix of driver channels 1590 to drive each individual rail of each tile 1550 in a tiled metasurface of a tunable optical device 1500 with Tile[t] 1510 and Tile[t+1] 1520, according to one embodiment. The illustrated driver circuit 1575 operates as a one-dimensional passive matrix controller with the i-th rail in each tile 1510 and 1520 connected together, such that the number of driver outputs or driver channels is equal to the number of rails per tile.

Figure 16:
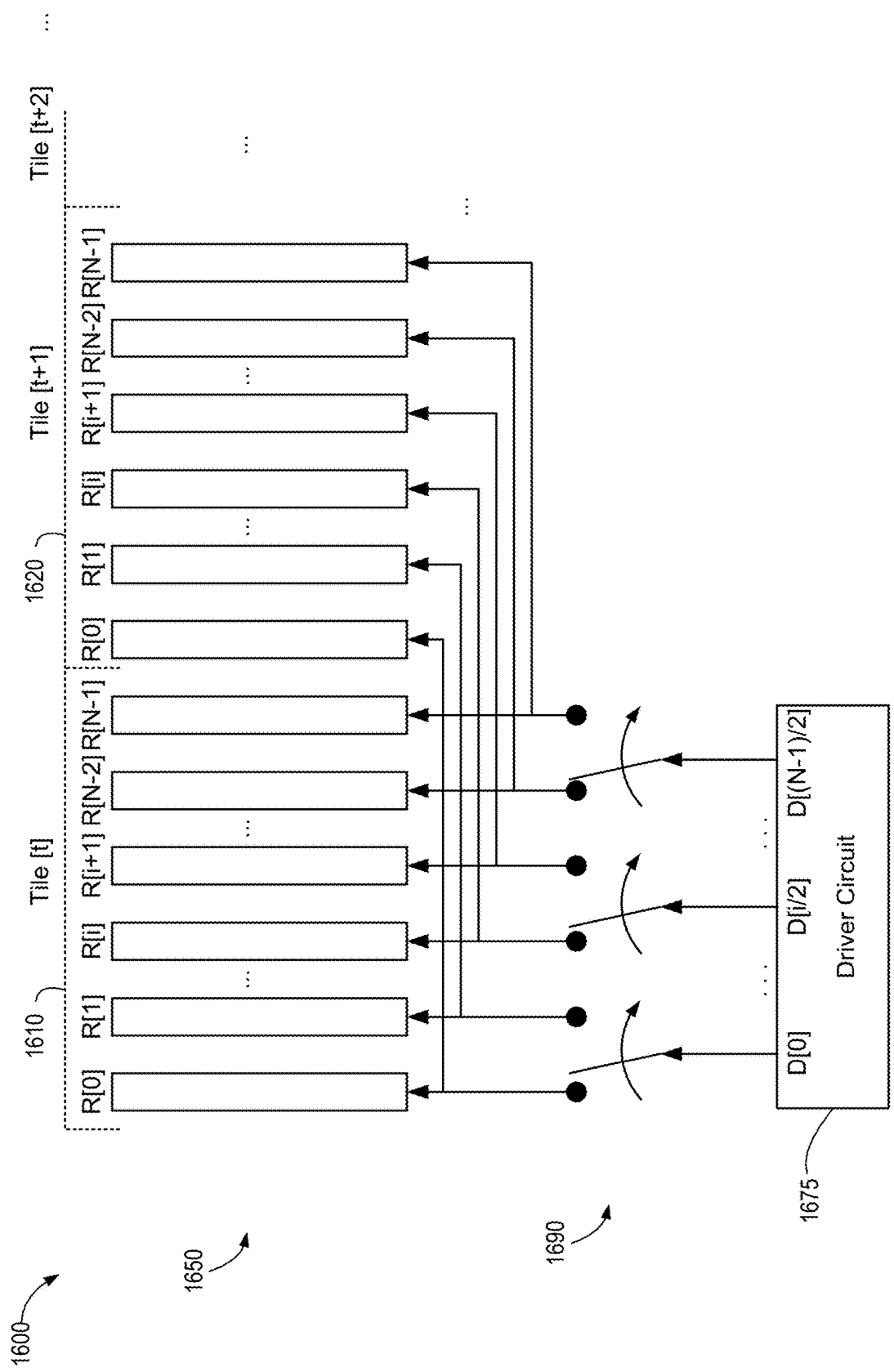
FIG. 16 illustrates an example of a 2:1 active switched-matrix integrated driver circuit to drive tiled rails of a metasurface, according to one embodiment.

FIG. 16 illustrates an example of an active switched matrix integrated driver circuit 1675 to drive tiled rails 1650 of a metasurface of a tunable optical device 1600, according to one embodiment. The simplified embodiment includes a Tile[t] 1610 and a Tile[t+1] 1620 that each includes a large number of tiles R[0] through R[N−1], where N is any integer value. As illustrated, the outputs of the driver circuit 1675 are switched by switching circuitry 1690 to allow for a reduction in the number of drive outputs while still maintaining individual control of the rails 1650 in each tile 1610 and 1620. Again, the i-th rail in each tile is connected together, so the reduction in the number of drive outputs in the driver circuit 1675 is based on the number of switched driver channels in the switching circuitry 1690 to which each drive output can be switched.

In the illustrated embodiment, the switching circuitry 1690 actively switches each drive output between two rails, such that the number of drive outputs D is half of that of an equivalent one-dimensional passive matrix controller. As described herein and generally applicable to the illustrated embodiments, the driver circuit operates to apply a voltage pattern to the rails of the metasurface (tiled or untiled) to cause the metasurface to deflect (e.g., reflectively beam steer or transmissively beam steer) incident optical radiation according to a target deflection pattern.

In embodiments in which the driver circuit is embodied as a one-dimensional passive matrix controller, the driver circuit may continuously drive each rail (or each corresponding rail in each tile) with a voltage value that is constant for a given beam steering deflection pattern. In embodiments in which the driver circuit is embodied as a two-dimensional active switch-matrix controller, the applied voltage value on any single rail persists through intrinsic capacitance until the driver reapplies the bias and refreshes the charge of the rail. In some embodiments, capacitive elements may be used to increase the persistence time of the applied voltage on each rail as the driver output is switched between the other rails in the metasurface.

Figure 17:
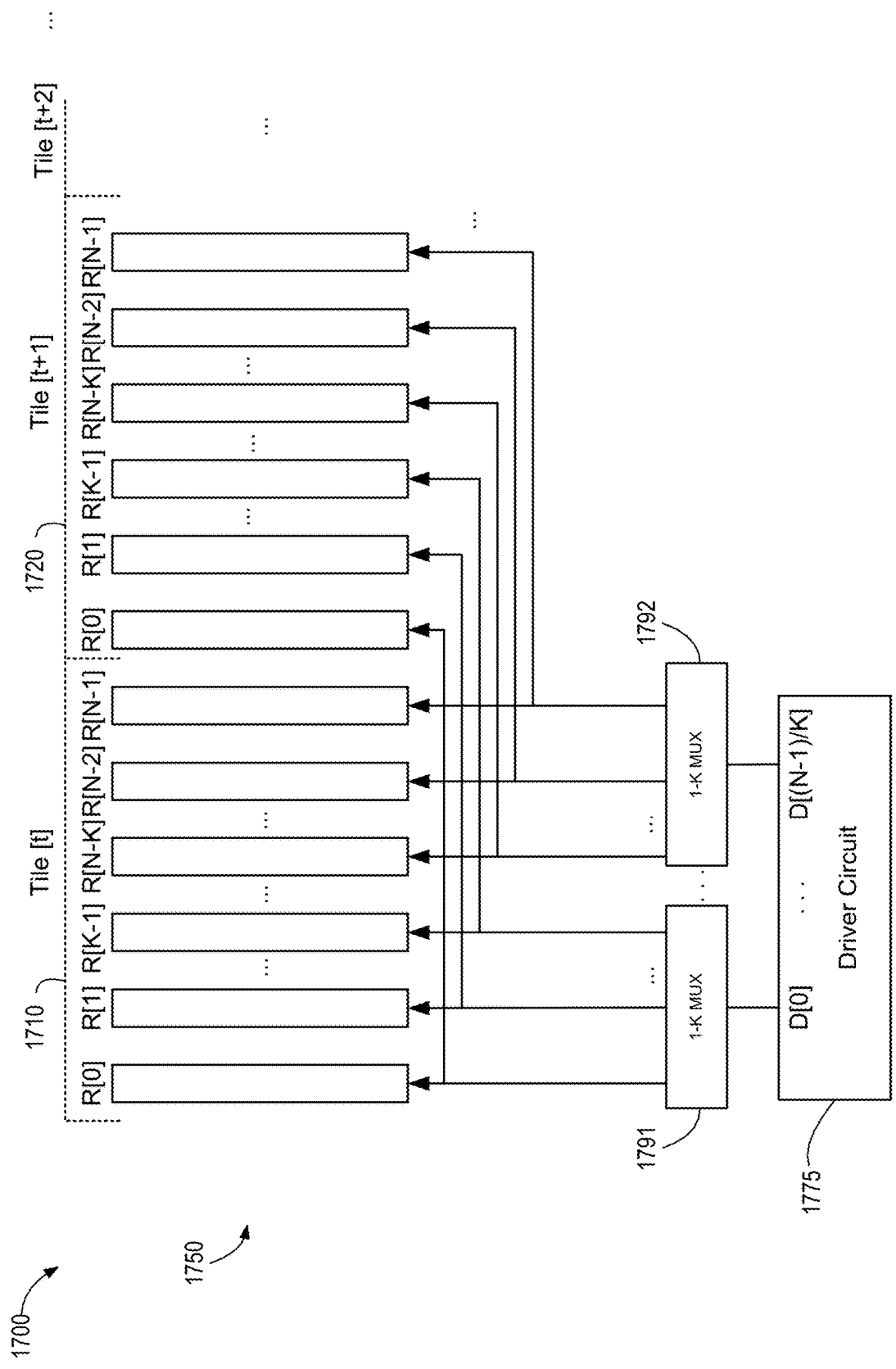
FIG. 17 illustrates an example of a K:1 active switched-matrix integrated driver circuit to drive tiled rails of a metasurface, according to one embodiment.

FIG. 17 illustrates an example of a K:1 active switched-matrix integrated driver circuit 1775 to drive tiled rails 1750 of a metasurface of a tunable optical device 1700, according to one embodiment. the K:1 active switched-matrix integrated driver circuit may be embodied as a plurality of 1-to-K multiplexors (MUXes) 1791 and 1792. The 1:K MUXes 1791 and 1792 switch each driver output between K driver channels, where K is an integer value that is an integer factor of the number rails N in each tile 1710 and 1720 of the metasurface of the tunable optical device 1700. Accordingly, the number of drive outputs D can be reduced from N in an equivalent one-dimensional passive matrix controller to N/K drive outputs with each drive output switched between K driver channels.

Figure 18A:
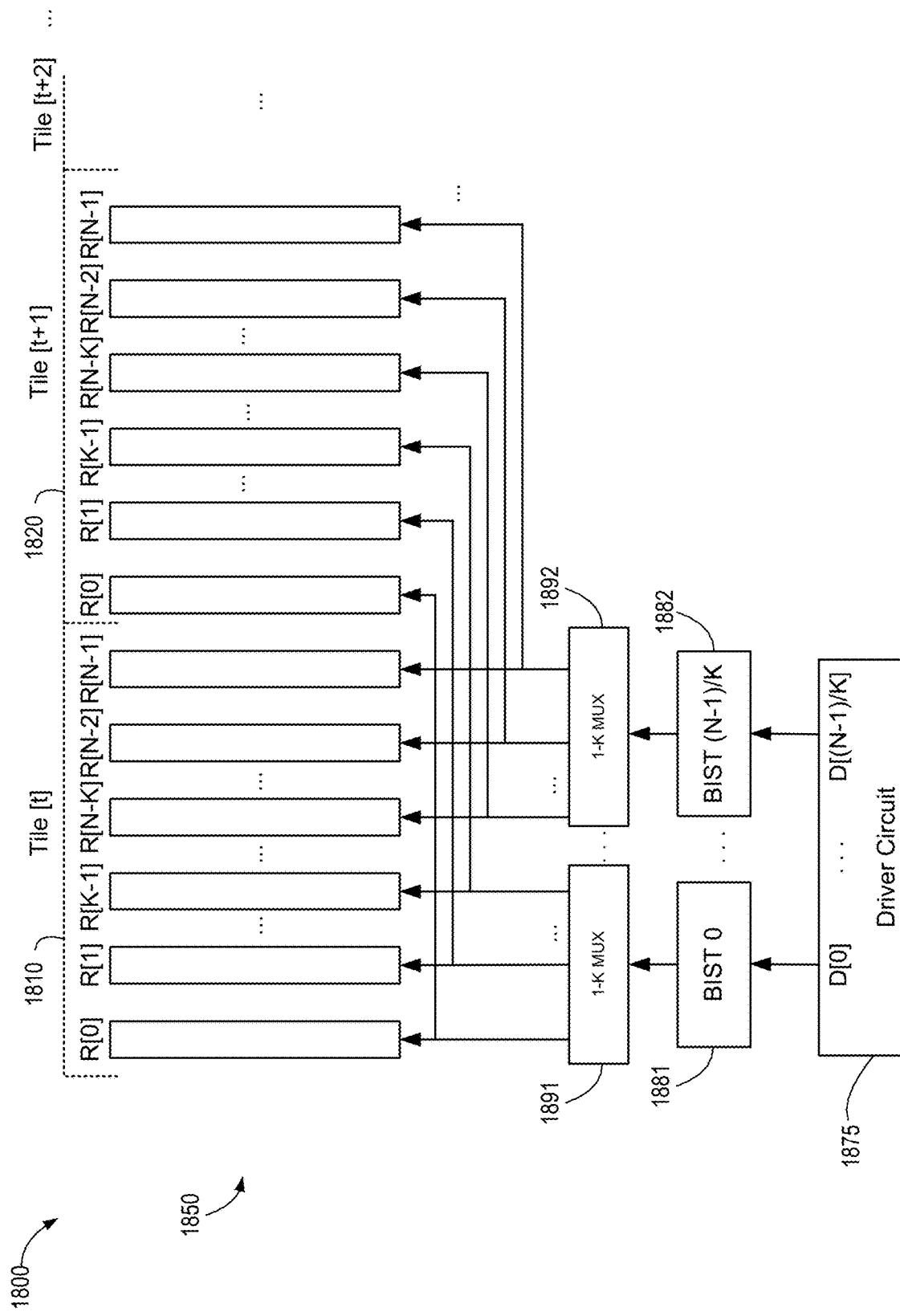
FIG. 18A illustrates an example of an active switched-matrix integrated driver circuit with built-in self-test (BIST) circuits, according to one embodiment.

FIG. 18A illustrates an example of an active switched-matrix integrated driver circuit 1875 with built-in self-test (BIST) circuits 1881 and 1882 before the 1:K MUXes 1891 and 1892, according to one embodiment. The driver circuit 1875 drives the optical structures 1850 (e.g., elongated metal rails) of each tile 1810 and 1820 of a metasurface of a tunable optical device 1800, as described herein. The BIST circuits 1881 and 1882 may operate to perform functions of the diagnostic circuit described herein. For example, the BIST circuits 1881 and 1882 may be integrated within the substrate of the tunable optical device 1800 and configured to test one or more tuning or electrical characteristics of the optical structures 1850 of the metasurface of the tunable optical device 1800. The BIST circuits 1881 and 1882 may be used to identify and disable defective optical structures and/or groups of optical structures.

In the illustrated embodiment, the BIST circuits 1881 and 1882 are in front of the MUXes 1891 and 1892 such that the number of BIST circuits 1881 and 1882 is equal to the number of rails N divided by the number of driver channels K between which each driver output is switched by each 1:K MUX 1891 and 1892. Each BIST circuit can be used to test electrical characteristics (e.g., resistance, capacitance, inductance, resonance, and/or other characteristics, such as a tuning characteristic) of K rails in each of the tiles in the metasurface of the tunable optical device 1800. As such, disabling the optical structures 1850 associated with one of the BIST circuits 1881 and 1882 results in the disablement of K times T optical structures, where T is the number of tiles in the metasurface of the tunable optical device 1800.

Figure 18B:
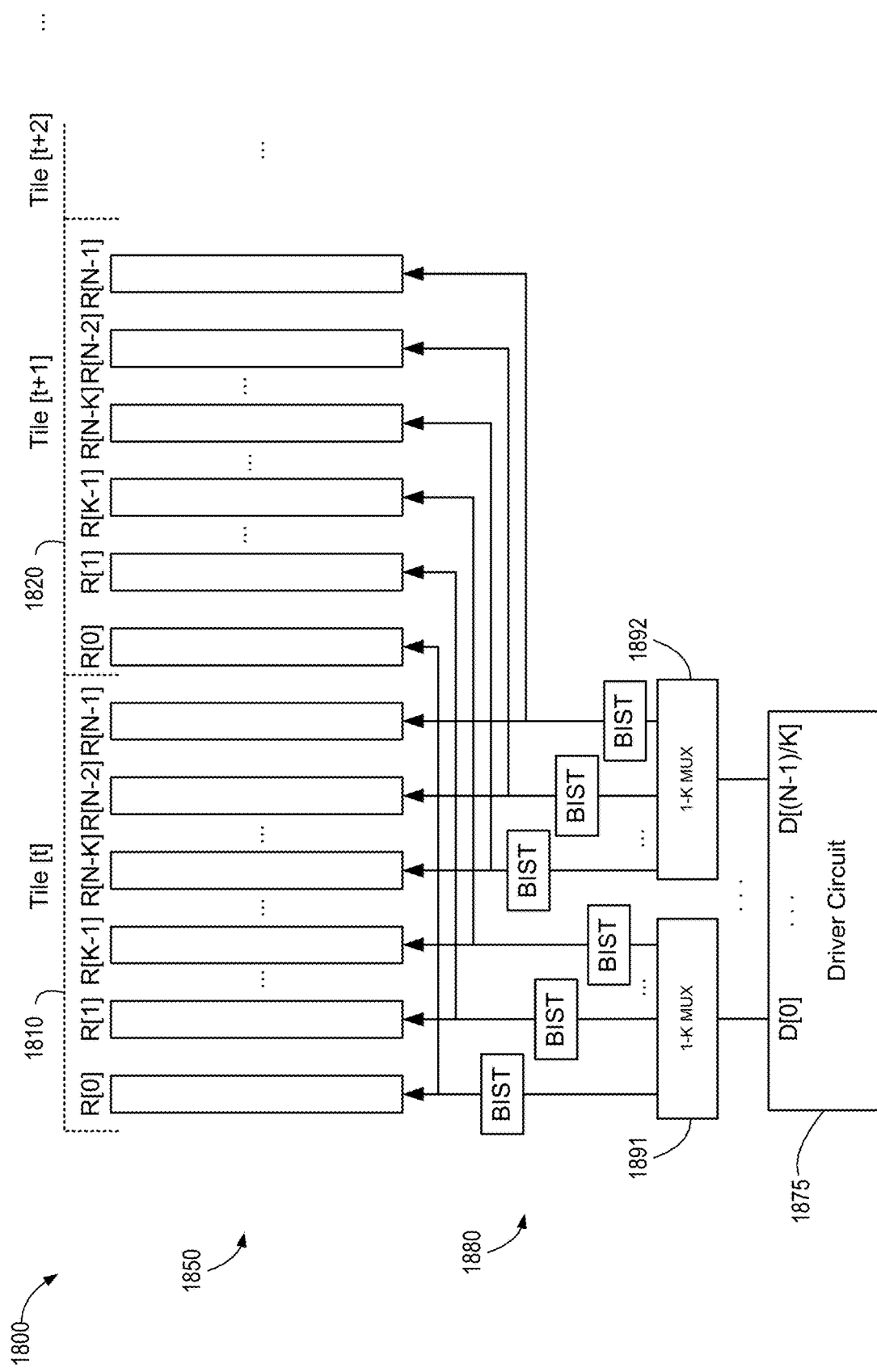
FIG. 18B illustrates another example of an active switched-matrix integrated driver circuit with BIST circuits, according to another embodiment.

FIG. 18B illustrates another example of an active switched-matrix integrated driver circuit 1875 with BIST circuits 1880 on the outputs of the 1:K MUXes 1891 and 1892. The illustrated embodiment includes N BIST circuits 1880, where N is the number of optical structures in each tile of the metasurface of the tunable optical device 1800. As described above, the BIST circuits 1880 can be used to test tuning or electrical characteristics of downstream optical structures 1850. The increased number of BIST circuits 1880 allows for more granular testing and disabling of optical structures. Specifically, disabling the optical structures 1850 associated with one of the BIST circuits 1880 results in the disablement of T optical structures, where T is the number of tiles in the metasurface 1800.

Figure 18C:
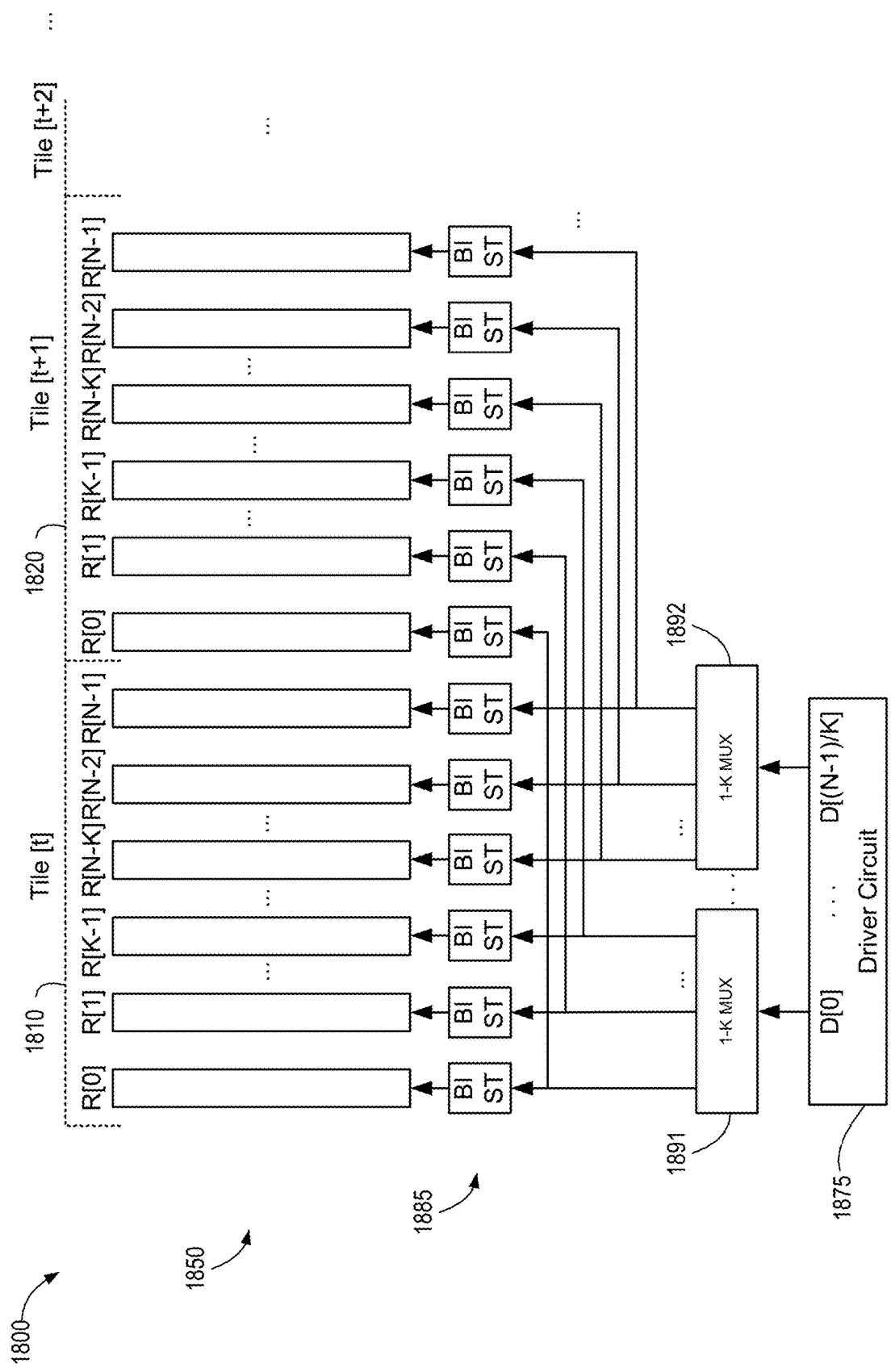
FIG. 18C illustrates a third example of an active switched-matrix integrated driver circuit with BIST circuits, according to another embodiment.

FIG. 18C illustrates a third example of an active switched-matrix integrated driver circuit 1875 with a BIST circuit 1885 for each individual optical structure of the metasurface of the tunable optical device 1800. The illustrated embodiment includes N times T BIST circuits 1885, where N is the number of optical structures 1850 in each tile (e.g., 1810 and 1820) of the metasurface of the tunable optical device 1800 and T is the number of tiles in the metasurface of the tunable optical device 1800. The significantly increased number of BIST circuits 1885 allows for individual testing and disabling of each discrete optical structure 1850 of the metasurface of the tunable optical device 1800.

This disclosure has been made with reference to various exemplary embodiments, including the best mode. However, those skilled in the art will recognize that changes and modifications may be made to the exemplary embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. This disclosure should, therefore, be determined to encompass at least the following claims and all possible permutations thereof.

What is claimed is:

1. A tunable optical device, comprising:
a substrate;
a tunable metasurface comprising:
   a plurality of optical structures on the substrate, and
   a dielectric material with a tunable refractive index around the plurality of optical structures of the metasurface;
a driver circuit integrated within the substrate to selectively apply a voltage pattern to the plurality of optical structures to control deflection of incident optical radiation according to a target deflection pattern; and a heater circuit integrated within the substrate to automatically maintain the dielectric material above a minimum threshold temperature.

2. The tunable optical device of claim 1, wherein the driver circuit implements phase and amplitude control of optical radiation deflected by the optical structures of the metasurface to implement a target deflection pattern that corresponds to a target far-field optical radiation pattern.

3. The tunable optical device of claim 1, further comprising:
   a photon shield layer between the metasurface and the driver circuit, wherein the photon shield layer is configured to prevent optical radiation from disrupting operation of the driver circuit.

4. The tunable optical device of claim 3, wherein the photon shield layer comprises a metal layer.

5. The tunable optical device of claim 3, wherein the photon shield layer comprises a dielectric layer that includes one or more of: amorphous carbon, organically-modified glass, a polymer, and graphite.

6. The tunable optical device of claim 1, wherein the heater circuit comprises at least one resistor, at least one heat distribution plate, and an automatic temperature-controlled feedback loop.

7. The tunable optical device of claim 1, wherein each of the plurality of optical structures comprises at least one of: a metal, a dielectric, and a semiconductor material.

8. The tunable optical device of claim 1, wherein the plurality of optical structures of the metasurface comprises a one-dimensional array of elongated metal rails arranged parallel to one another with respect to an underlying optical reflector.

9. The tunable optical device of claim 8, wherein the elongated metal rails comprise elongated copper rails formed using a damascene manufacturing process, followed by etching an intermetal dielectric and subsequent passivation of the copper.

10. The tunable optical device of claim 1, wherein the plurality of optical structures of the metasurface comprises a two-dimensional array of metal pillars arranged with sub-wavelength interelement spacings, wherein each of the metal pillars extends from an underlying optical reflector.

11. The tunable optical device of claim 1, wherein the dielectric material with the tunable refractive index comprises one or more of: liquid crystal, an electro-optic polymer, a chalcogenide glass, and a semiconductor material.

12. The tunable optical device of claim 1, wherein the driver circuit comprises a steering pattern subcircuit to store voltage patterns corresponding to defined deflection patterns.

13. The tunable optical device of claim 1, wherein the driver circuit comprises a lidar sequencing controller integrated within the substrate to sequentially drive the metasurface according to a sequence of defined deflection patterns for targeted lidar operation.

14. The tunable optical device of claim 1, wherein the driver circuit comprises a one-dimensional passive matrix controller with driver channels integrated within the substrate to individually control each optical structure of the metasurface.

15. The tunable optical device of claim 1, wherein the driver circuit comprises an active switch-matrix controller integrated within the substrate that is switchable to control individual optical structures of the metasurface, such that D driver channels of the switch-matrix controller are switched between N optical structures, where each driver channel is switched between K optical structures, such that N=K*D, where each of D, K, and N are integer values.

16. The tunable optical device of claim 1, wherein the optical structures of the metasurface are arranged in a tiled configuration with T tiles that each include N optical structures, where the N optical structures of each of the T tiles share C common control inputs, where N, T, and C are each integer values, and
   wherein the driver circuit comprises an individual driver channel for each of the C common control inputs.

17. The tunable optical device of claim 1, wherein the optical structures of the metasurface are arranged in a tiled configuration with T tiles that each include N optical structures, where the N optical structures across the T tiles share a common control input, such that there are N control inputs, and
   wherein the driver circuit comprises an active switch-matrix controller integrated within the substrate with D driver channels that are switched between the N common control inputs that are shared by the N optical structures in each of the T tiles, where each driver channel is switched between K optical structures, such that N=K*D, where each of T, N, D, and K are integer values.

18. The tunable optical device of claim 1, further comprising:
   a diagnostic circuit integrated within the substrate to:
      test an electrical characteristic of at least some of the optical structures,
      identify an optical structure that is defective, and
      disable at least the identified defective optical structure.

19. The tunable optical device of claim 18, wherein the diagnostic circuit integrated within the substrate is configured to disable the identified defective optical structure by updating a configuration of the driver circuit to apply a null voltage differential to the disabled optical structure during operation.

20. The tunable optical device of claim 1, further comprising:
   a photodetector circuit integrated within the substrate to:
      detect defective operation of the tunable optical device, and
      disable the tunable optical device in response to the detected defective operation.

21. A tunable optical device, comprising:
   a substrate;
   a tunable metasurface comprising:
      a plurality of optical structures on the substrate, and
      a dielectric material with a tunable refractive index around the plurality of optical structures of the metasurface; and
   a heater circuit integrated within the substrate to automatically maintain the dielectric material with the tunable refractive index above a minimum threshold temperature.

22. The tunable optical device of claim 21, wherein the heater circuit comprises at least one resistor, at least one heat distribution plate, and an automatic temperature-controlled feedback loop.

23. The tunable optical device of claim 21, further comprising:
   a driver circuit integrated within the substrate to selectively apply a voltage pattern to the plurality of optical structures to control deflection of incident optical radiation according to a target deflection pattern.

24. The tunable optical device of claim 23, wherein the driver circuit comprises a steering pattern subcircuit to store voltage patterns corresponding to defined deflection patterns.

25. The tunable optical device of claim 23, wherein the driver circuit comprises a lidar sequencing controller integrated within the substrate to sequentially drive the metasurface according to a sequence of defined deflection patterns for lidar detection.

26. The tunable optical device of claim 21, further comprising:
- a diagnostic circuit integrated within the substrate to:
  - test an electrical characteristic of at least some of the optical structures,
  - identify an optical structure that is defective, and
  - disable at least the identified defective optical structure.

27. The tunable optical device of claim 26, further comprising:
- a driver circuit integrated within the substrate to selectively apply a voltage pattern to the plurality of optical structures to control deflection of incident optical radiation according to a target deflection pattern.

28. The tunable optical device of claim 21, further comprising:
- a photodetector circuit integrated within the substrate to:
  - detect defective operation of the tunable optical device, and
  - disable the tunable optical device in response to the detected defective operation.

* * * * *